United States Patent
Watanabe et al.

(10) Patent No.: US 7,969,844 B2
(45) Date of Patent: Jun. 28, 2011

(54) OPTICAL DISC DEVICE

(75) Inventors: Katsuya Watanabe, Nara (JP); Akira Yoshikawa, Nara (JP); Eiji Ueda, Osaka (JP); Hiroshige Ishibashi, Osaka (JP); Yuuichi Kuze, Osaka (JP)

(73) Assignee: Panasonic Corporation, Osaka (JP)

( * ) Notice: Subject to any disclaimer, the term of this patent is extended or adjusted under 35 U.S.C. 154(b) by 336 days.

(21) Appl. No.: 12/301,832

(22) PCT Filed: Jul. 9, 2007

(86) PCT No.: PCT/JP2007/063685
§ 371 (c)(1),
(2), (4) Date: Nov. 21, 2008

(87) PCT Pub. No.: WO2008/007646
PCT Pub. Date: Jan. 17, 2008

(65) Prior Publication Data
US 2010/0232273 A1    Sep. 16, 2010

(30) Foreign Application Priority Data
Jul. 10, 2006   (JP) ................................. 2006-189441

(51) Int. Cl.
*G11B 27/36* (2006.01)
(52) U.S. Cl. ................. 369/53.2; 369/47.14; 369/53.15; 369/53.17
(58) Field of Classification Search .................. 369/53.2, 369/47.14, 53.15, 53.17
See application file for complete search history.

(56) References Cited

U.S. PATENT DOCUMENTS

| 5,818,804 | A  | * | 10/1998 | Obata et al. ................ | 369/44.32 |
| 7,313,059 | B2 | * | 12/2007 | Nishigaki ................... | 369/44.32 |
| 7,626,905 | B2 | * | 12/2009 | Lai et al. .................... | 369/53.15 |
| 7,800,992 | B2 | * | 9/2010 | Tseng et al. ............... | 369/44.32 |
| 2003/0012105 | A1 | | 1/2003 | Miyazaki et al. | |
| 2004/0130982 | A1 | * | 7/2004 | Lee et al. ................... | 369/44.32 |

(Continued)

FOREIGN PATENT DOCUMENTS

JP    2912251    4/1999

(Continued)

OTHER PUBLICATIONS

Extended European Search Report for corresponding European Application No. 10004188.8 dated Jun. 24, 2010.

(Continued)

*Primary Examiner* — Wayne R Young
*Assistant Examiner* — Brenda Bernardi
(74) *Attorney, Agent, or Firm* — Renner, Otto, Boisselle & Sklar, LLP

(57) ABSTRACT

An optical disc apparatus includes: a defect detecting section 124 for detecting, based on a light detection signal and with respect to a preset detection reference level, a fingerprint or a bubble on the disc 102 as a defect to output a defect detection signal; and a waveform shaping section 126 to output a hold signal that holds, in response to the defect detection signal, a signal from a tracking control section 109 at a level just before the defect has occurred. The apparatus is initially operated not to hold the signal from the tracking control section 109 even if there is a defect. But once a tracking failure has occurred during a read operation, settings are changed to hold the signal from the tracking control section 109 against the defect while the read operation is retried.

19 Claims, 14 Drawing Sheets

U.S. PATENT DOCUMENTS

2004/0202092 A1    10/2004   Nishimura et al.
2004/0233805 A1*   11/2004   Yoshida et al. ............. 369/47.14
2007/0121456 A1*   5/2007    Kono et al. ................. 369/53.15

FOREIGN PATENT DOCUMENTS

| JP | 2002-319135 | 10/2002 |
| JP | 2003-162834 | 6/2003 |
| JP | 2005-085406 | 3/2005 |
| JP | 2006-155740 | 6/2006 |

OTHER PUBLICATIONS

International Search Report for corresponding Application No. PCT/JP2007/063685 mailed Oct. 16, 2007.

Form PCT/ISA/237 and partial English Translation, dated Jan. 17, 2008.

Co-pending US Appl. No. 12/193,072, filed Aug. 18, 2008 (application attached).

* cited by examiner

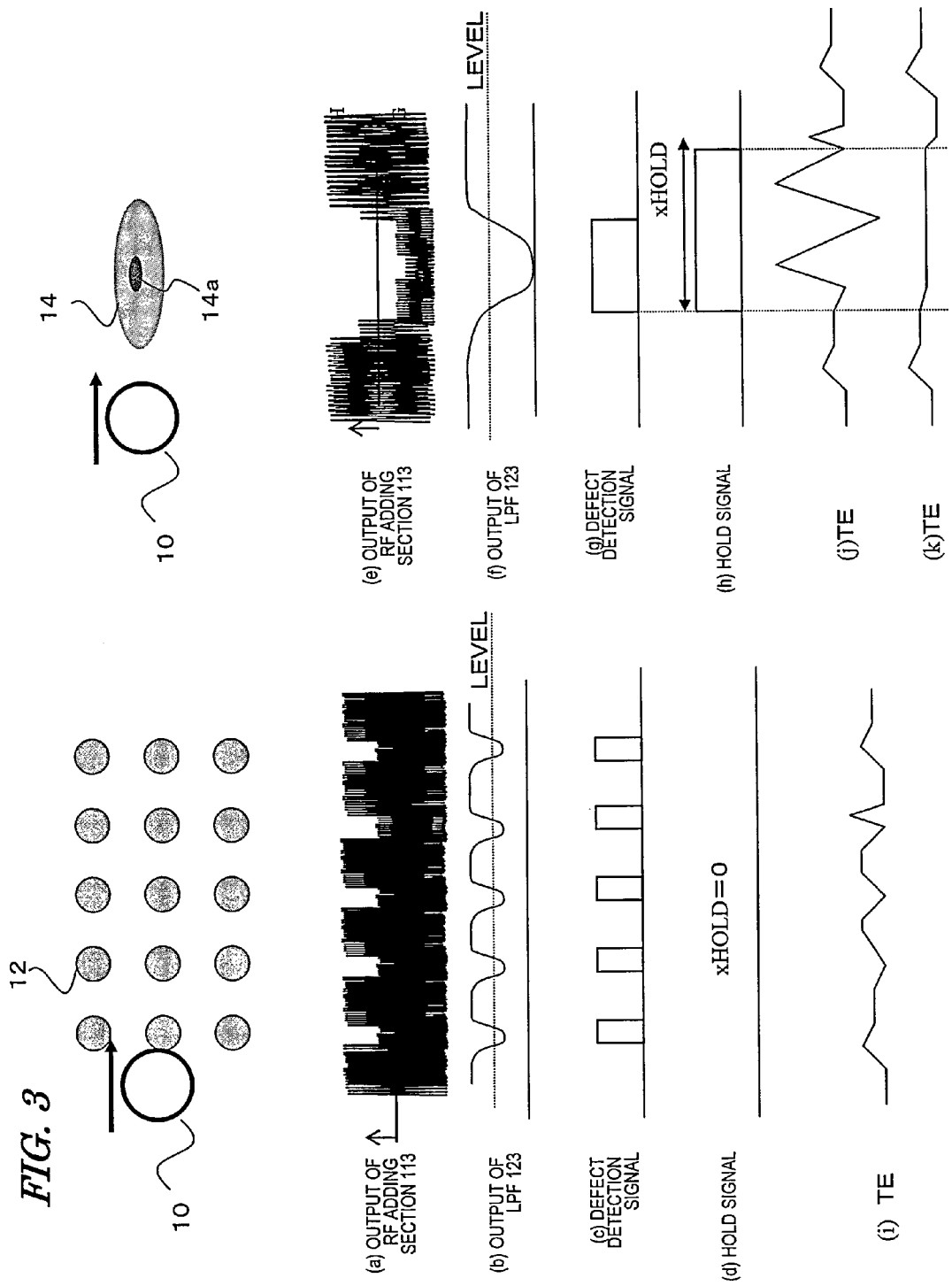

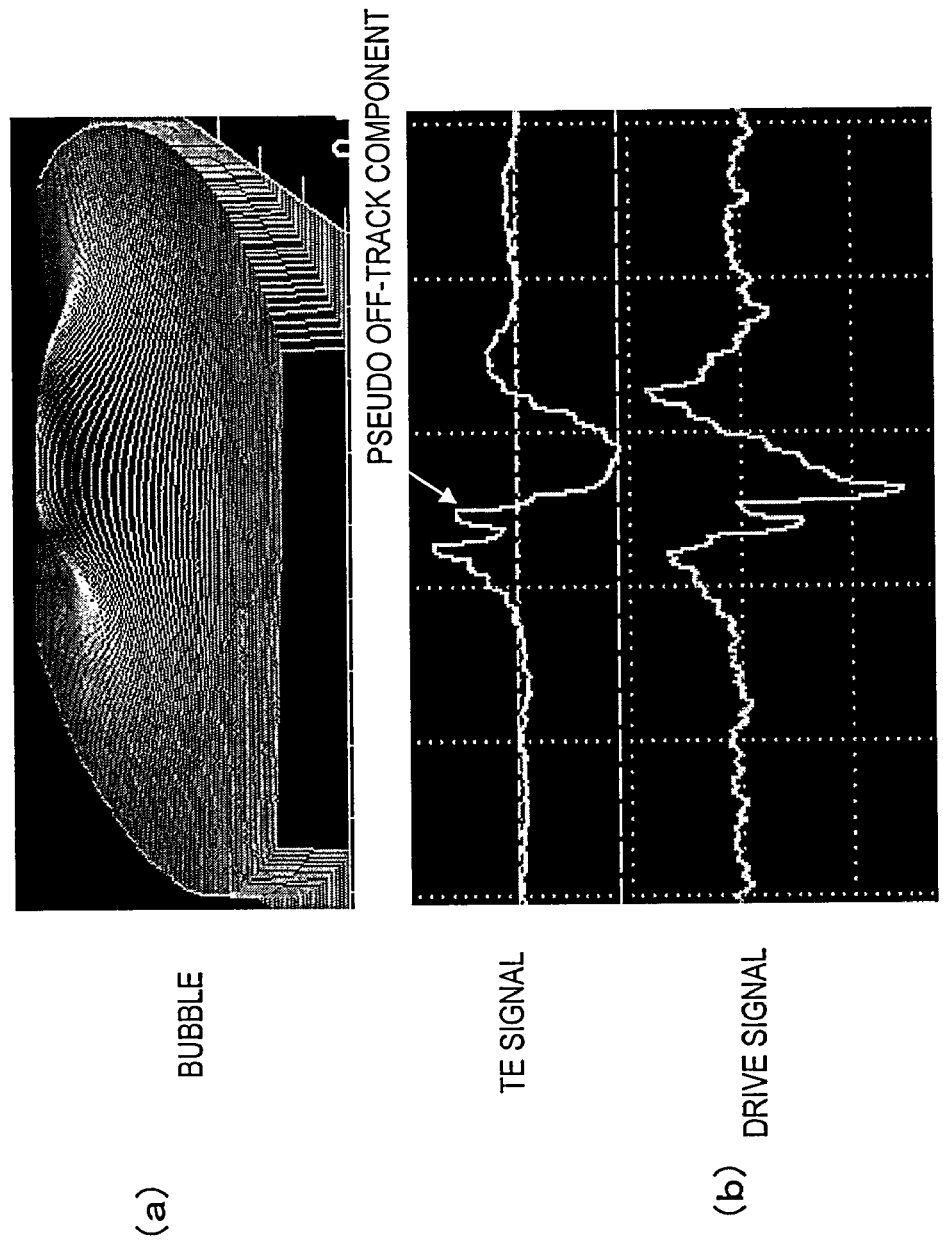

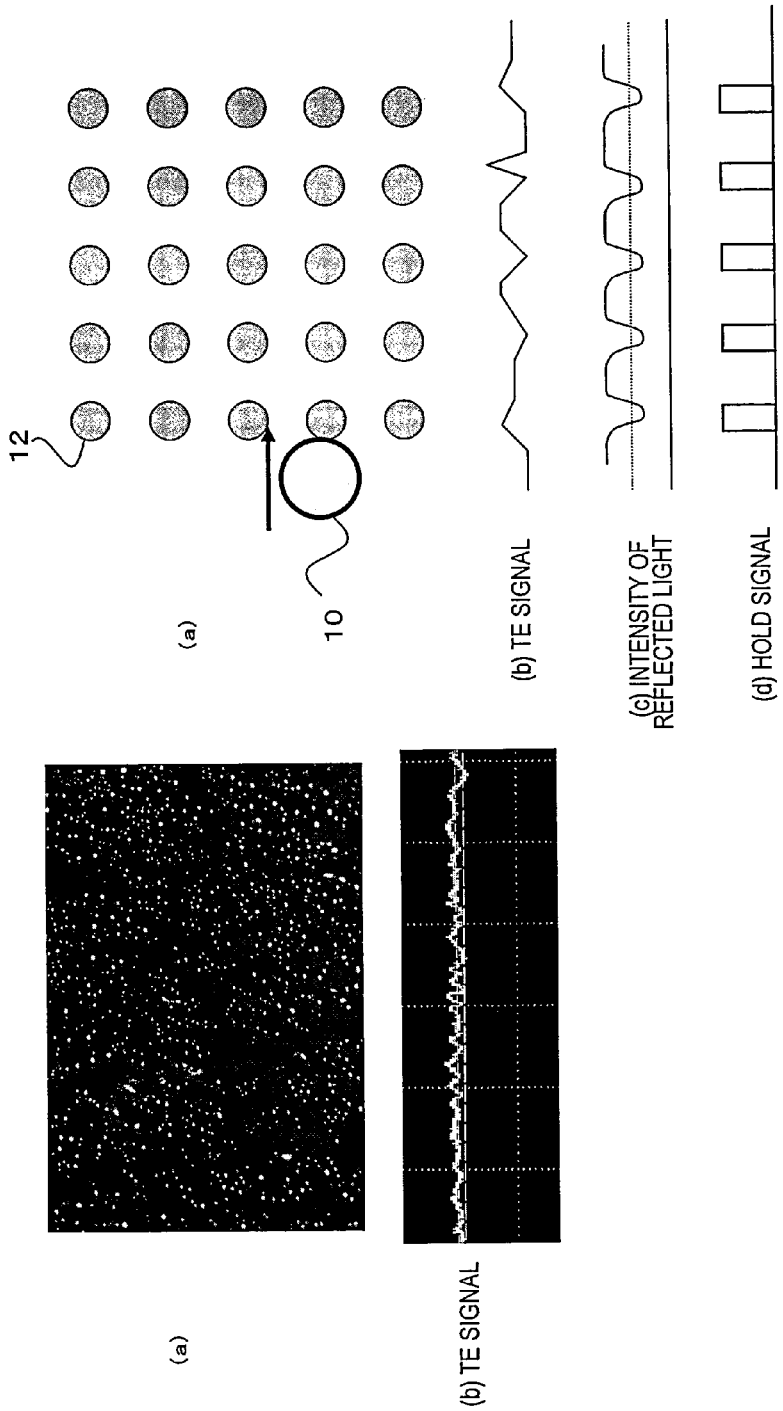

FIG. 11
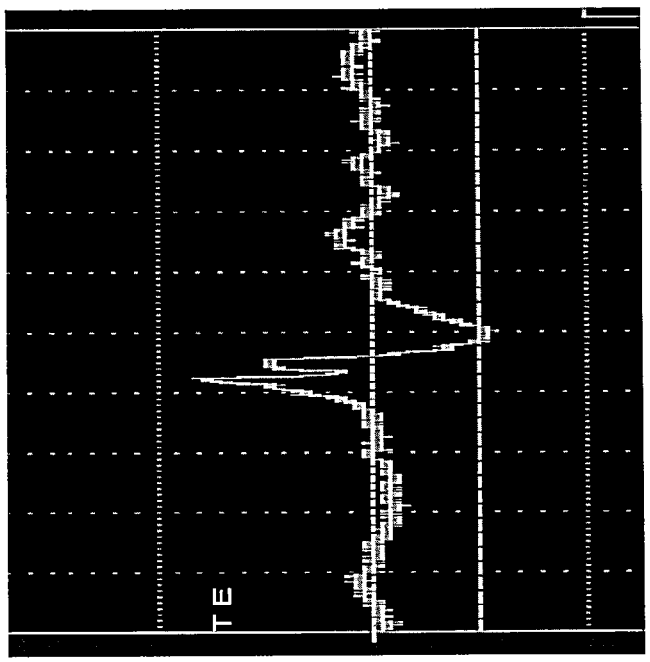
(a)
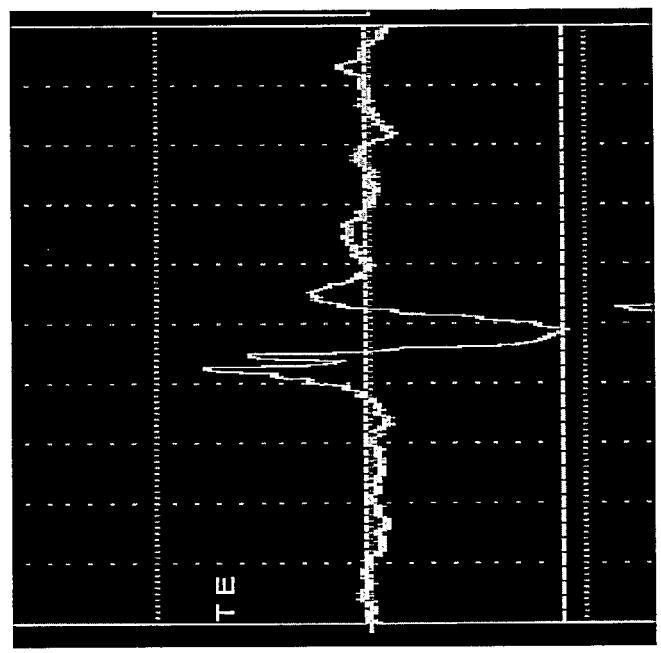
(b)

OPTICAL DISC DEVICE

TECHNICAL FIELD

The present invention relates to an optical disc apparatus and more particularly relates to an optical disc apparatus that can perform a read operation appropriately even on an optical disc with such a structure that often causes tracking failures due to the presence of bubbles.

BACKGROUND ART

In optical disc technologies, data can be read out from a rotating optical disc by irradiating the disc with a relatively weak light beam with a constant intensity, and detecting the light that has been modulated by, and reflected from, the optical disc.

On a read-only optical disc, information is already stored as pits that are arranged spirally during the manufacturing process of the optical disc. On the other hand, on a rewritable optical disc, a recording material film, from/on which data can be read and written optically, is deposited by an evaporation process, for example, on the surface of a substrate on which tracks with spiral lands or grooves are arranged. In writing data on a rewritable optical disc, data is written there by irradiating the optical disc with a light beam, of which the optical power has been changed according to the data to be written, and locally changing the property of the recording material film.

It should be noted that the depth of the pits, the depth of the tracks and the thickness of the recording material film are smaller than the thickness of the optical disc base material. For that reason, those portions of the optical disc, where data is stored, define a two-dimensional plane, which is sometimes called a "storage plane" or an "information plane". However, considering that such a storage plane actually has a physical dimension in the depth direction, too, the term "storage plane (information plane)" will be replaced herein by another term "information layer". Every optical disc has at least one such information layer. Optionally, a single information layer may actually include a plurality of layers such as a phase-change material layer and a reflective layer.

To read data that is stored on an optical disc or to write data on a rewritable optical disc, the light beam always needs to maintain a predetermined converging state on a target track on an information layer. For that purpose, a "focus control" and a "tracking control" are required. The "focus control" means controlling the position of an objective lens perpendicularly to the information layer (which direction will be referred to herein as a "substrate depth direction") such that the focus position (or focal point) of the light beam is always located on the information layer. On the other hand, the "tracking control" means controlling the position of the objective lens along the radius of a given optical disc (which direction will be referred to herein as a "disc radial direction") such that the light beam spot is always located right on a target track.

To get the focus control and tracking control done, a focus error or a tracking error needs to be detected based on the light reflected from an optical disc and the location of the light beam spot needs to be adjusted so as to minimize the error. The magnitudes of the focus error and the tracking error are respectively represented by a "focus error (FE) signal" and a "tracking error (TE) signal" that are generated based on the light reflected from the optical disc.

However, if there is any defect such as dust or a scratch on the surface of an optical disc, the intensity of the reflected light will decrease significantly when the light beam passes through that defect. As a result, a TE signal with an appropriate level cannot be generated anymore, thus producing tracking abnormality. Consequently, some type of tracking failure such as a track jump would happen without taking any countermeasure. To avoid such tracking failures, when the presence of any defect is sensed by such a decrease in the intensity of the reflected light, a tracking control signal is temporarily put on hold at the level just before the defect according to a conventional technique. As long as the tracking control signal is held at a certain level, even if any abnormality occurred on the TE signal, the tracking control would not be affected by such abnormality. As a result, tracking failures would hardly occur due to the defects.

Once the light beam has passed the defect, the tracking control signal is preferably taken out of hold as quickly as possible. That is to say, the tracking control signal is put on hold only while the intensity of the reflected light becomes lower than a preset level (i.e., reference sensing level) due to the presence of the defect.

Such an optical disc apparatus that is designed to avoid tracking failures by sensing defects on an optical disc is disclosed in Patent Documents Nos. 1 and 2, for example.

Patent Document No. 1: Japanese Patent Publication No. 2912251

Patent Document No. 2: Japanese Patent Application Laid-Open Publication No. 2003-162834

DISCLOSURE OF INVENTION

Problems to be Solved by the Invention

Various types of optical discs such as DVD (digital versatile disc)-ROM, DVD-RAM, DVD-RW, DVD-R, DVD+RW and DVD+R have become more and more popular these days as storage media on which a huge amount of information can be stored at a high density. Meanwhile, CDs (compact discs) are still popular now.

To increase the storage density of an optical disc, the light beam that has been converged on the data plane of an optical disc preferably has as small a spot size as possible. The spot size of a light beam is inversely proportional to the numerical aperture NA of an objective lens for use to converge the light beam. Thus, by increasing the numerical aperture NA of the objective lens, the spot size of the light beam can be decreased. Meanwhile, Blu-ray Disc (BD), HD-DVD and other next-generation optical discs that have even higher storage density and even bigger storage capacity than the optical discs mentioned above have been developed and become more and more popular nowadays. A BD requires a larger objective lens NA than a DVD's and covers the surface of its information layer with a thin light transmitting layer with a thickness of approximately 100 μm.

In an optical disc such as a BD on which data is supposed to be stored at a high density, a new problem, which has never been an issue in conventional optical discs, has arisen. For example, when a light transmitting layer is formed on the substrate of a BD during the manufacturing process thereof, the air might be trapped in the gap between the light transmitting layer and the substrate to produce bubbles there. If there were such bubbles, the light transmitting layer would warp and lose its planarity locally.

FIGS. 7(a) and 7(b) illustrate the shape of a raised portion that was actually formed on the surface of a BD (i.e., on the surface of its light transmitting layer) due to the production of a bubble, which typically has a size (diameter) of approximately 500 μm to approximately 1,000 # m. If a bubble were produced between the information layer of a BD and the light transmitting layer thereof, the surface of the light transmitting layer would be raised locally as shown in FIG. 7 because the light transmitting layer has as small a thickness as approximately 100 μm. Almost no reflected light returns from the center (or the core) of the bubble but the light beam is not transmitted normally through the raised portion surrounding the bubble, either. The objective lens for use to perform a read/write operation on a BD has a high NA and forms a focal point on a shallow information layer under the surface of the disc. That is why even if the light transmitting layer were warped only slightly, the spherical aberration would change significantly and the intensity of the reflected light would vary easily.

FIG. 8(a) illustrates the unevenness formed on the surface of a disc due to the presence of a bubble, while FIG. 8(b) shows the respective waveforms of a TE signal and a drive signal to be monitored when a light beam passes the bubble. While the light beam is following the centerline of the tracks, the amplitude of the TE signal is at zero level. However, as the light beam shifts from the centerline of the tracks in the disc radial direction, the TE signal comes to have non-zero amplitude components. In that case, to cancel the shift (which is so-called "off-track") of the light beam from the centerline of the tracks, the position of the objective lens in the optical pickup is adjusted in the disc radial direction. The position of the objective lens in the disc radial direction is adjusted by a lens actuator in the optical pickup. The drive signal shown in FIG. 8(b) shows the waveform of drive current supplied to the lens actuator.

As shown in FIG. 8, when the light beam crosses the bubble on the BD, the waveform of the TE signal comes to have a component representing a pseudo off-track phenomenon. Such a waveform component is produced due to the presence of a bubble even if the light beam does follow the centerline of the tracks. That is why such a component will be referred to herein as a "pseudo off-track component" of a TE signal. If such a pseudo off-track component were produced in the TE signal, the tracking control would be carried out in response to the pseudo off-track component and the light beam spot would come off the target track, which is a problem.

It should be noted that a DVD is made by bonding together two base members, each having a thickness of approximately 600 μm. That is why bubbles are not easily produced between the two base members. Also, even if any bubbles were produced between the base members, the surface of the optical disc would never be raised due to the presence of bubbles because one of the two base members that functions as a light transmitting layer has as large a thickness as 600 μm. What is more, a DVD requires a much smaller NA than a BD does, and the sensitivity of a DVD to spherical aberration is just one tenth of that of a BD. Consequently, in a DVD, the TE signal and the light intensity signal are hardly affected by those bubbles.

The tracking failures that could be caused by the pseudo off-track components should be avoided by sensing those bubbles. However, when applied to a BD, the technique disclosed in Patent Document No. 1 or 2 sometimes does not work properly. Hereinafter, this problem will be discussed.

First of all, unlike a defect such as dust or a scratch that has posed a problem in conventional optical discs, a bubble will decrease the intensity of the reflected light only slowly and relatively lightly. That is why to avoid tracking failures due to the presence of bubbles, even if the intensity of the reflected light has decreased only slightly, it must be determined that the light beam has crossed a bubble and the tracking control signal should be put on hold.

However, a fingerprint could be left in a wide area on the surface of an optical disc, and could also decrease the intensity of the reflected light. The decrease in the intensity of the reflected light due to the presence of a fingerprint is smaller than a situation where there is a scratch or dust on the surface of the disc and is close to a situation where there is a bubble on the disc surface. For that reason, if one tries to detect a bubble and put the tracking control signal on hold by sensing a decrease in the intensity of the reflected light, then the tracking control would also be put on hold when a fingerprint is detected.

However, as described above, a fingerprint often covers a broader area than a bubble or a scratch on the surface of the disc. That is why according to the method described above, the tracking control signal would be put on hold for too long a time to avoid tracking failures sufficiently.

Thus, according to the conventional techniques, bubbles and fingerprints cannot be distinguished from each other just by sensing a decrease in the intensity of the reflected light, and tracking failures due to the presence of those defects on the optical disc cannot be avoided appropriately. This problem is particularly remarkable in a BD in which the surface of its information layer is covered with a thinner light transmitting layer than a DVD's, and therefore, should be solved one way or another to make BDs more and more popular.

In order to overcome the problems described above, the present invention has an object of providing an optical disc apparatus that can operate properly even if there is a bubble or a fingerprint on the surface of a given optical disc.

Means for Solving the Problems

An optical disc apparatus according to the present invention includes: at least one objective lens that converges a light beam on an information layer of an optical disc; a photodetector for generating a light detection signal based on light that has been reflected from the optical disc; a tracking actuator for driving the objective lens along the radius of the optical disc; a tracking error detecting section for generating a tracking error signal based on the light detection signal; a tracking control section for driving the tracking actuator based on the tracking error signal to make the light beam follow tracks on the disc; a defect detecting section for detecting, based on the light detection signal, a portion of the optical disc where the intensity of the reflected light has decreased as a defect, thereby outputting a defect detection signal; and a tracking condition setting section for setting a tracking condition that determines how easily a tracking failure is caused by the defect. If multiple types of defects that could occur on the optical disc include a first type of defect, of which the size is relatively small, and a second type of defect, of which the size is relatively large, the tracking condition setting section initially adopts, as the tracking condition, a condition on which a tracking failure is less likely to occur due to the first type of defect. But if any tracking abnormality has occurred during a read operation, the tracking condition setting section changes the tracking conditions into a one on which a tracking failure is less likely to occur due to the second type of defect.

In one preferred embodiment, the size of the first type of defect is smaller than the diameter of a light beam spot to be formed by the light beam on the surface of the optical disc, while the size of the second type of defect is greater than the diameter of the light beam spot.

In a specific preferred embodiment, the first type of defect is a fingerprint dot that has been left on the surface of the optical disc, while the second type of defect is a bubble that has been produced inside the optical disc.

In another preferred embodiment, the tracking condition setting section includes a hold signal generating section for generating, based on the defect detection signal, a hold signal for holding the tracking error signal at a level just before the defect has occurred. If a tracking failure has occurred under the initial tracking condition, then the tracking condition setting section changes the settings of the hold signal generating section such that a hold period, defined by the hold signal, is extended compared to the one before the tracking failure has occurred.

In still another preferred embodiment, the tracking condition setting section includes a gain setting section for controlling the gain of tracking control. If any tracking abnormality has occurred, the tracking condition setting section decreases the value of the gain.

In an alternative preferred embodiment, the tracking condition setting section includes a rotational velocity setting section for controlling the rotational velocity of the optical disc. If any tracking abnormality has occurred, the tracking condition setting section increases the rotational velocity.

In yet another preferred embodiment, the optical disc apparatus further includes a retry determining section for determining whether or not a retried read operation should be performed in a situation where a tracking error or a read error, of which the magnitude is equal to or greater than a predetermined value, has occurred during a read operation.

In yet another preferred embodiment, if a tracking error or a read error, of which the magnitude is equal to or greater than a predetermined value, has occurred during a read operation, the tracking condition setting section changes the tracking conditions into a one, on which a tracking failure is less likely to occur due to the second type of defect, before the tracking failure actually happens.

In yet another preferred embodiment, if the defect detection signal has not been generated in a situation where the tracking failure has occurred, the tracking condition setting section does not change the tracking conditions even during a retried read operation.

In yet another preferred embodiment, the optical disc apparatus further includes fingerprint detecting means for determining whether or not the defect is a fingerprint. If the defect has turned out to be a fingerprint in a situation where a tracking failure has occurred due to the defect, the tracking condition setting section performs a retried read operation without changing the tracking conditions.

Another optical disc apparatus according to the present invention can read data from multiple types of optical discs, including a first type of optical disc compliant with a BD standard and a second type of optical disc compliant with an HD-DVD standard. The apparatus includes: at least one objective lens that converges a light beam on an information layer of a given optical disc, which has been selected from the multiple types of optical discs and with which the optical disc apparatus is loaded; a photodetector for generating a light detection signal based on light that has been reflected from the optical disc; a tracking actuator for driving the objective lens along the radius of the optical disc; a tracking error detecting section for generating a tracking error signal based on the light detection signal; a tracking control section for driving the tracking actuator based on the tracking error signal to make the light beam follow tracks on the disc; a defect detecting section for detecting, based on the light detection signal, a portion of the optical disc where the intensity of the reflected light has decreased as a defect, thereby outputting a defect detection signal; and a tracking condition setting section for setting a tracking condition that determines how easily a tracking failure is caused by the defect. The tracking condition setting section changes the tracking conditions depending on whether the given optical disc is the first type or the second type.

In one preferred embodiment, while performing a retry operation after a tracking failure has occurred due to the defect, the tracking condition setting section does change the tracking conditions if the given optical disc is the first type but does not change the tracking conditions if the given optical disc is the second type.

In another preferred embodiment, in a situation where the given optical disc is the first type, if multiple types of defects that could occur on the optical disc include a first type of defect, of which the size is relatively small, and a second type of defect, of which the size is relatively large, the tracking condition setting section initially adopts, as the tracking condition, a condition on which a tracking failure is less likely to occur due to the first type of defect. But if any tracking abnormality has occurred during a read operation, the tracking condition setting section changes the tracking conditions into a one on which a tracking failure is less likely to occur due to the second type of defect.

In a specific preferred embodiment, the first type of defect is a fingerprint dot that has been left on the surface of the optical disc, while the second type of defect is a bubble that has been produced inside the optical disc.

In another preferred embodiment, in a situation where the given optical disc is the second type, if multiple types of defects that could occur on the optical disc include a first type of defect, of which the size is relatively small, and a second type of defect, of which the size is relatively large, the tracking condition setting section initially adopts, as the tracking condition, a condition on which a tracking failure is less likely to occur due to the first type of defect. But if any tracking abnormality has occurred during a read operation, the tracking condition setting section performs a retry operation without changing the tracking conditions.

An integrated circuit device according to the present invention is used in an optical disc apparatus that includes an optical pickup and a tracking control section. The integrated circuit device includes a fingerprint detecting section for determining, based on a light detection signal obtained from the optical pickup, whether or not a fingerprint has been left.

In one preferred embodiment, the fingerprint detecting section includes: a timer for keeping time until a predetermined period passes; and a counter for counting the number of pulses, which are included in a defect detection signal that has been generated based on the light detection signal obtained from the optical pickup, during the predetermined period. It is determined, by the count of the pulses during the predetermined period, whether or not a fingerprint has been left.

In a specific preferred embodiment, the predetermined period is adjusted according to a read rate of the optical disc.

Another integrated circuit device according to the present invention is used in an optical disc apparatus that includes an optical pickup and a tracking control section. The circuit device includes: a defect detecting section for detecting a portion of an optical disc where the intensity of reflected light has decreased as a defect based on a light detection signal obtained from the optical pickup, thereby outputting a defect detection signal; and a tracking condition setting section for setting a tracking condition that determines how easily a tracking failure is caused by the defect. If multiple types of defects that could occur on the optical disc include a first type of defect, of which the size is relatively small, and a second type of defect, of which the size is relatively large, the tracking condition setting section initially adopts, as the tracking condition, a condition on which a tracking failure is less likely to occur due to the first type of defect. But if any tracking failure has occurred during a read operation, the tracking condition setting section changes the tracking conditions into a one on which a tracking failure is less likely to occur due to the second type of defect.

In one preferred embodiment, the tracking condition setting section includes a hold signal generating section for generating, based on the defect detection signal, a hold signal for holding the tracking error signal at a level just before the defect has occurred. If a tracking failure has occurred under the initial tracking condition, then the tracking condition setting section changes the settings of the hold signal generating section such that a hold period, defined by the hold signal, is extended compared to the one before the tracking failure has occurred.

In another preferred embodiment, the tracking condition setting section includes a gain setting section for controlling the gain of tracking control. If any tracking failure has occurred, the tracking condition setting section decreases the value of the gain.

In still another preferred embodiment, the tracking condition setting section includes a rotational velocity setting section for controlling the rotational velocity of the optical disc. If any tracking failure has occurred, the tracking condition setting section increases the rotational velocity.

Effects of the Invention

An optical disc apparatus according to the present invention is initially operated with its settings adjusted so as to perform a read operation appropriately even if there is a relatively small first type of defect (e.g., a fingerprint) on the surface of an optical disc. On the other hand, if there is any relatively large second type of defect (e.g., a bubble), the apparatus lets some tracking abnormality such as a tracking failure occur on purpose. But if any tracking failure has occurred due to a defect while a read operation is being performed on an optical disc, then the apparatus changes the initial settings and retries a read operation under such a condition on which a tracking failure is less likely to occur even with a relatively large second type of defect (such as a bubble).

Portions (a) to (k) of FIG. 3 show the waveforms of various types of signals to be generated when a light beam spot crosses a fingerprint or a bubble in a first preferred embodiment of the present invention.

Figure 4A:
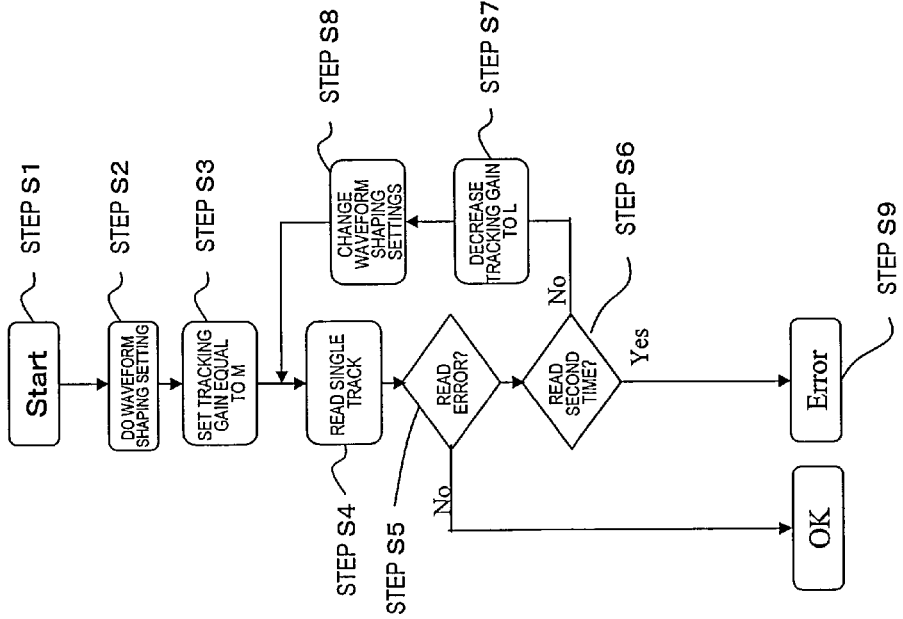

FIG. 4A is a flowchart showing the procedure of read processing according to the first preferred embodiment of the present invention.

Figure 4B:
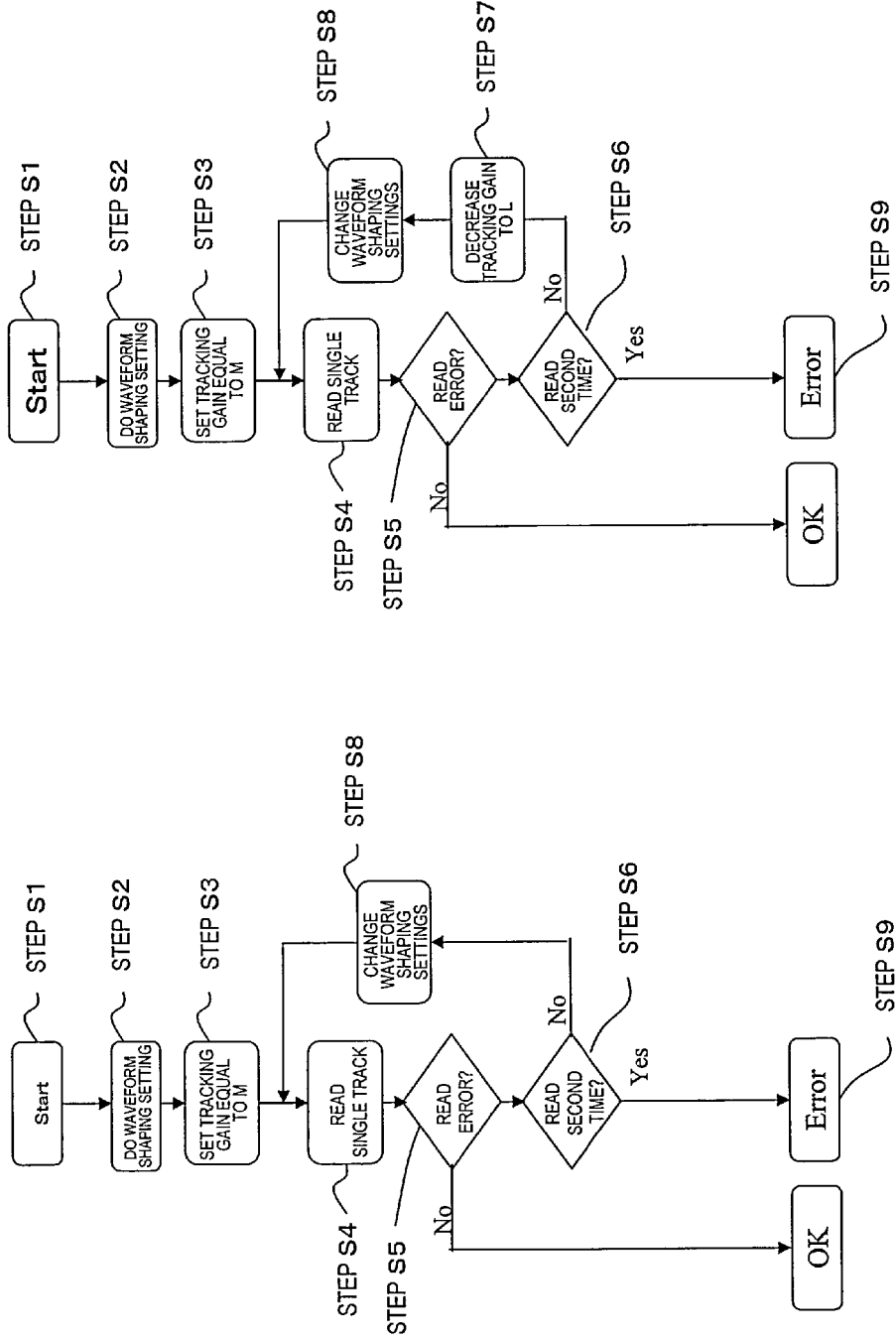

FIG. 4B is a flowchart showing the procedure of another read processing according to the first preferred embodiment.

Figure 5A:
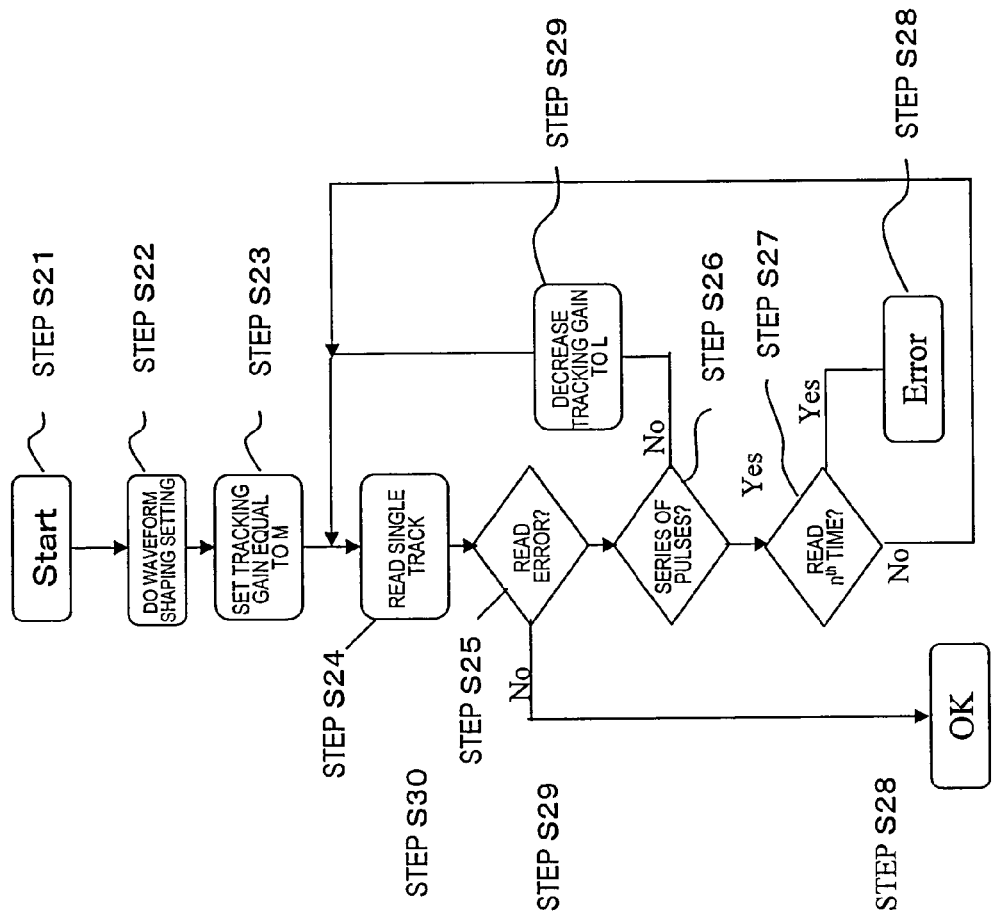

FIG. 5A is a flowchart showing the procedure of read processing according to a second preferred embodiment of the present invention.

Figure 5B:
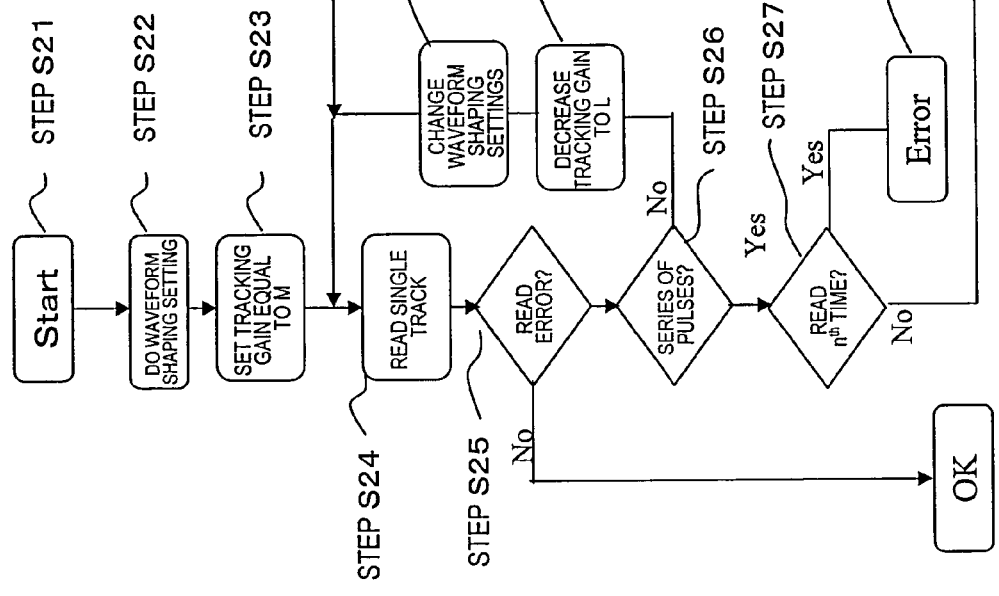

FIG. 5B is a flowchart showing the procedure of another read processing according to the second preferred embodiment.

Figure 6:
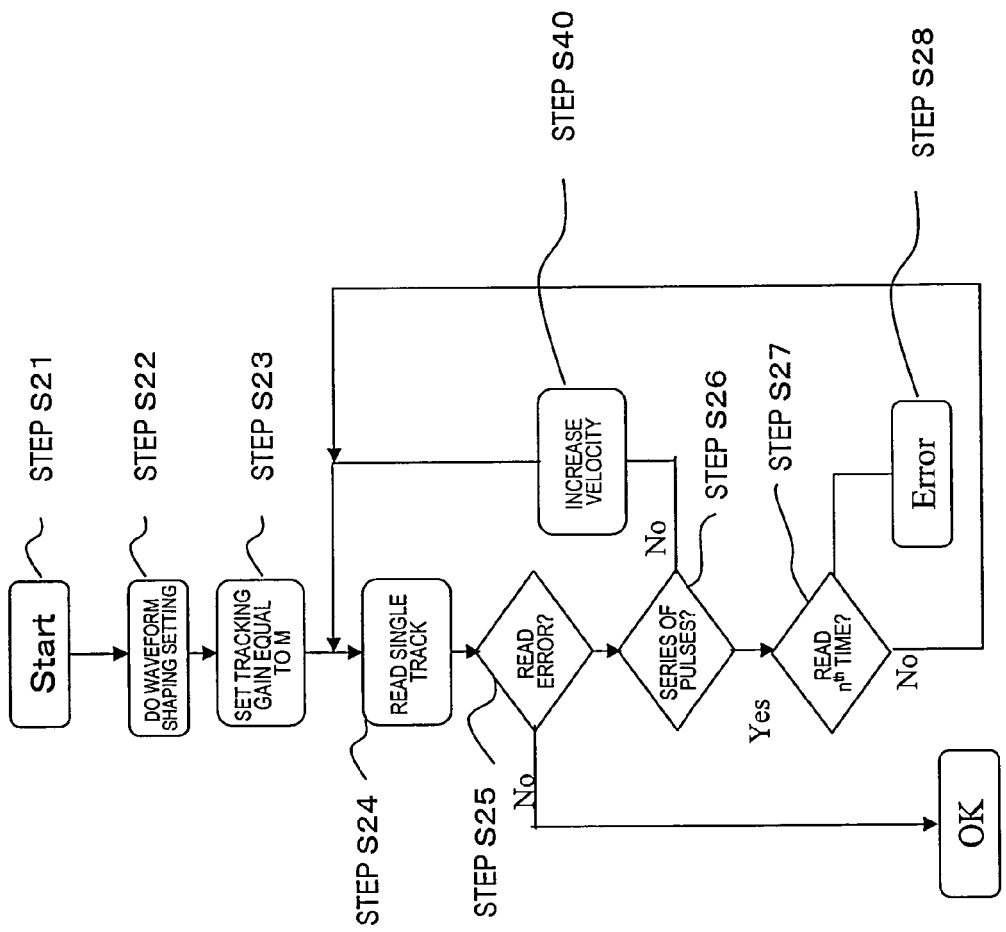

FIG. 6 is a flowchart showing the procedure of still another read processing according to the second preferred embodiment.

Figure 7:
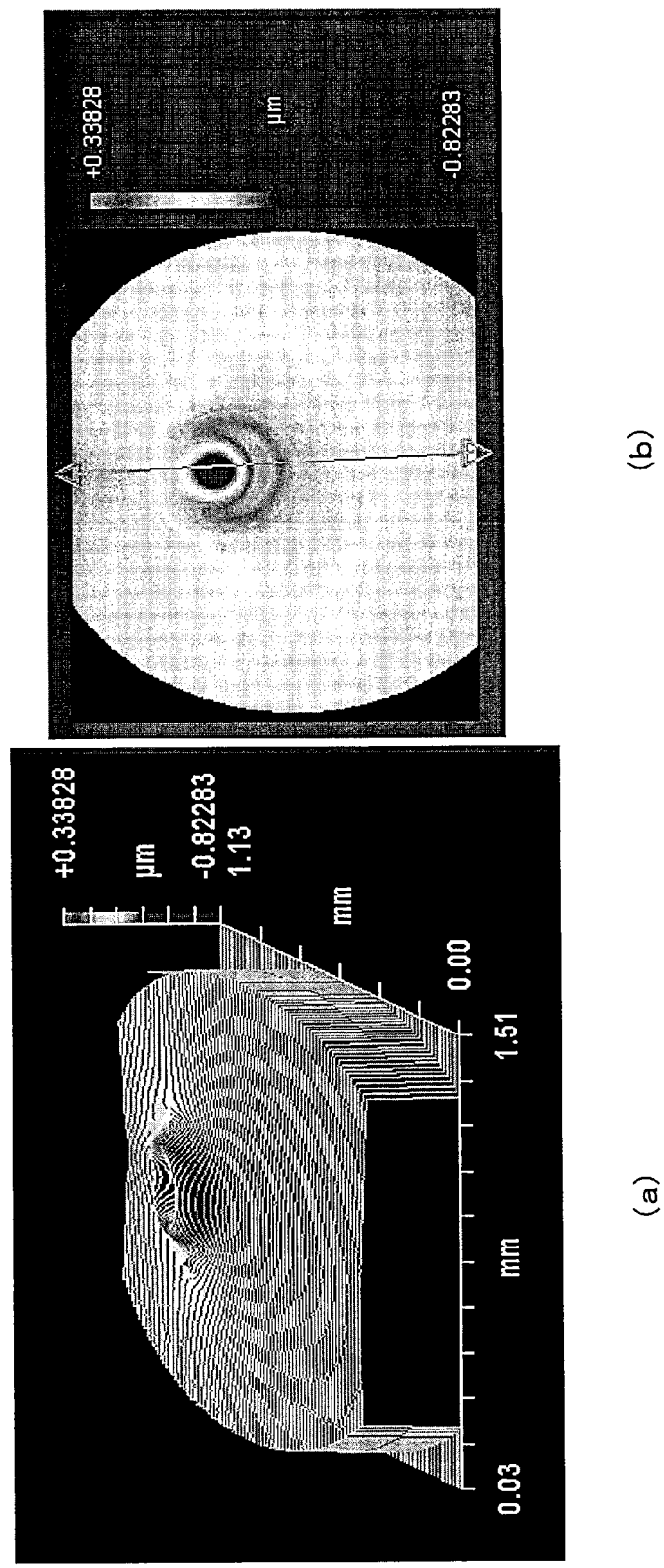

FIG. 7(a) illustrates the unevenness caused by a bubble on the surface of a BD and FIG. 7(b) illustrates such a surface.

FIG. 8(a) illustrates the unevenness formed on the surface of a BD due to the presence of a bubble, and FIG. 8(b) shows the respective waveforms of a TE signal and a drive signal obtained in the area with the bubble.

FIG. 9(a) is a micrograph representing the disc surface of a BD on which a fingerprint was left, and FIG. 9(b) shows the waveform of a TE signal in the area where the fingerprint was left.

Portion (a) of FIG. 10 is a schematic plan view illustrating a fingerprint that is left on the disc surface of a BD, and portions (b), (c) and (d) of FIG. 10 show the respective waveforms of a TE signal, the intensity of reflected light, and a hold signal obtained in an area with a bubble.

FIG. 11(a) shows the waveform of a TE signal when a read operation is performed for the first time with the gain of tracking servo set to be relatively high, and FIG. 11(b) shows the waveform of a TE signal when a read operation is performed for the second time and so on with the gain of the tracking servo set to be relatively low.

FIG. 12(a) is a cross-sectional view illustrating how a light beam with a wavelength of approximately 405 nm is converged on the information layer of a BD through an objective lens with an NA of 0.85, and FIG. 12(b) is a cross-sectional view illustrating how a light beam with a wavelength of approximately 650 nm is converged on the information layer of a DVD through an objective lens with an NA of 0.6.

Figure 13:
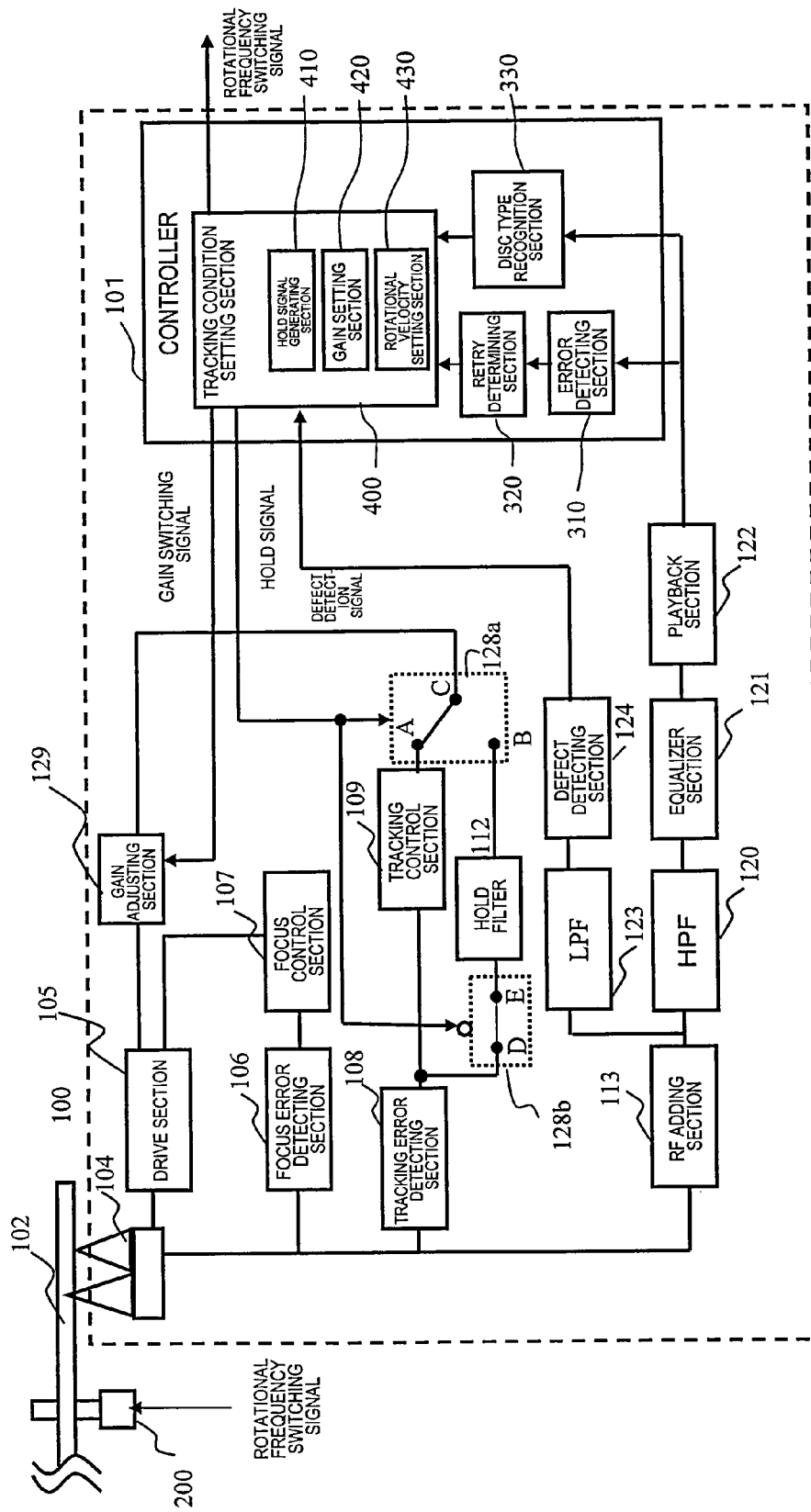

FIG. 13 shows the arrangement of functional blocks in an optical disc apparatus as a third preferred embodiment of the present invention.

DESCRIPTION OF REFERENCE NUMERALS 100 optical disc apparatus
101 controller
102 optical disc
104 optical pickup
105 drive section
106 focus error detecting section
107 focus control section
108 tracking error detecting section
109 tracking control section
111 processor (DSP)
112 HOLD filter
113 RF adder
123 LPF
124 defect detecting section
126 waveform shaping section
127 waveform shaping setting section
129 gain adjusting section
300 control section
310 error detecting section
320 retry determining section
400 tracking condition setting section
410 hold signal generating section
420 gain setting section
430 rotational velocity setting section
500 fingerprint detecting section

BEST MODE FOR CARRYING OUT THE INVENTION

Before preferred embodiments of an optical disc apparatus according to the present invention are described, a fingerprint that has been left on the disc surface of a BD and a bubble that has been produced under the light transmitting layer of an optical disc will be described in further detail.

Now look at FIGS. 9 and 10 first. FIG. 9(a) is a micrograph representing the disc surface of a BD on which a fingerprint was left, and FIG. 9(b) shows the waveform of a TE signal in the area where the fingerprint was left. In FIG. 9(a), a lot of white dots are observed. As these dots form the fingerprint, these dots will be referred to herein as "fingerprint dots". The fingerprint dots 12 have an average size of 65 to 75 µm.

Portion (a) of FIG. 10 is a plan view illustrating a schematic arrangement of the fingerprint dots 12. Portions (b), (c) and (d) of FIG. 10 show the respective waveforms of a TE signal, the intensity of reflected light, and a hold signal when a light beam crosses the fingerprint dots 12.

The fingerprint dots are actually located at random as shown in FIG. 9(a). However, as the sizes of those fingerprint dots and the intervals between them are not significantly varied, the fingerprint dots may be analyzed based on the model shown in portion (a) of FIG. 10.

On a BD, a short-wave light beam with a wavelength of approximately 405 nm is converged so finely by an objective lens with a large NA that the resolution of detection on the surface of the disc is much higher than that of a DVD. In a DVD, the size of an effective beam spot (i.e., effective cross section) on the information layer thereof is approximately four or five times as large as the light beam spot 10 shown in portion (a) of FIG. 10. And the diameter of the light beam spot on a DVD is approximately 1 µm, which is about twice as large as that of the light beam spot on a BD. Therefore, a DVD has an NA of 0.6 but the thickness of its light transmitting layer (i.e., substrate) is 0.6 mm, which is six times as large as a BD's. Consequently, the light beam spot on the surface of the information layer is expanded to 0.5 mm or more.

The pitch between fingerprint dots is normally in the range of 0.2 mm to 0.3 mm. For that reason, on a DVD, multiple fingerprint dots 12 will be included in a single beam spot, and therefore, a single fingerprint dot 12 cannot be sensed based on the intensity of the reflected light. Consequently, no fingerprint can be detected with the spot size of a DVD.

On the other hand, in a BD, the light beam spot 10 on its information layer has a diameter of approximately 0.4 µm or less shown in portion (a) of FIG. 10, and its light transmitting layer (coating layer) has as small a thickness as 0.1 mm. Thus, the spot size on the disc surface is only about 0.15 mm, which is approximately as large as the pitch between the fingerprint dots 12. Consequently, the resolution is so high that if a fingerprint is left on the disc surface of a BD, the intensity of the reflected light varies at high frequencies with respect to the respective fingerprint dots 12 as shown in portion (c) of FIG. 10. As a result, while the light beam spot 10 for BDs is scanning an area with a fingerprint on the disc surface of the BD, a normal TE signal that is not affected by the fingerprint dots 12 can be obtained from an area between the fingerprint dots 12 (i.e., the area in which the intensity of the reflected light does not decrease).

Figure 12:
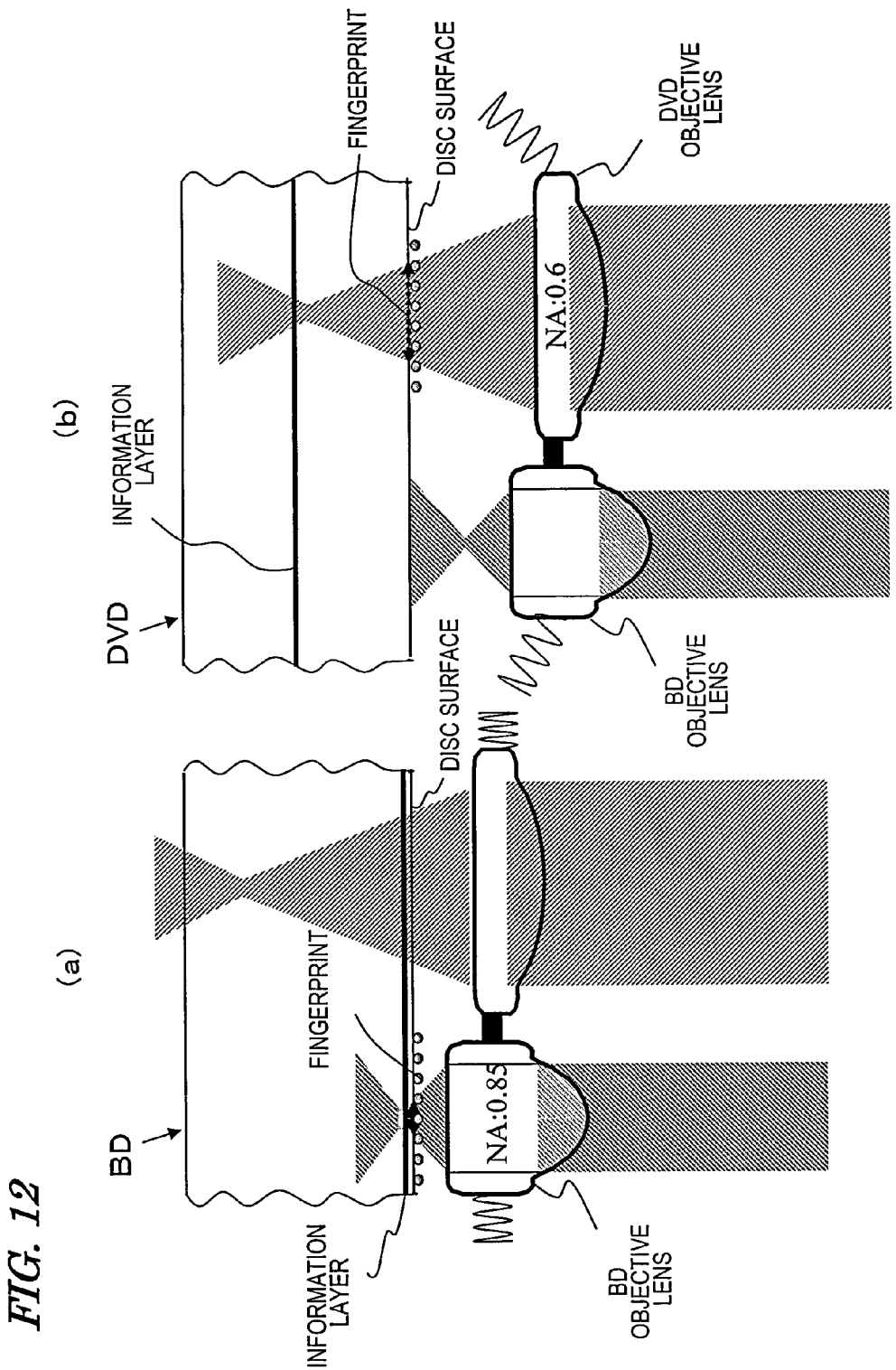

FIGS. 12(a) and 12(b) are schematic cross-sectional views illustrating how a light beam is converged on the information layer of a BD and on that of a DVD, respectively. In the example illustrated in FIG. 12, an objective lens (with an NA of 0.85) for BDs and an objective lens (with an NA of 0.6) for DVDs are supported together by the same lens actuator (not shown). In such an optical disc apparatus, if the given optical disc is a BD, a light beam that has been emitted with a wavelength of approximately 405 nm from a light source provided for BDs is converged by the BD objective lens onto the information layer of the BD. On the other hand, if the given optical disc is a DVD, a light beam that has been emitted with a wavelength of approximately 650 nm from a light source provided for DVDs is converged by the DVD objective lens onto the information layer of the DVD.

As described above, the light beam spot formed on the disc surface of a BD has a size that is small enough to detect the reflected light between the fingerprint dots as shown in FIG. 12(a). On the other hand, the light beam spot formed on the disc surface of a DVD has a size that is greater than the average interval between the fingerprint dots, and therefore, the reflected light between the fingerprint dots cannot be detected as shown in FIG. 12(b).

As described above, if the respective fingerprint dots 12 are detected by sensing a decrease in the intensity of the reflected light, then a hold signal can be generated every time the light beam spot 10 for BDs crosses any of the fingerprint dots 12. In this manner, by detecting the respective fingerprint dots 12 and by holding the TE signal only when the intensity of the reflected light decreases, the tracking failures can be avoided even if there are a lot of fingerprint dots in a broad area on a BD.

Nevertheless, if not just a fingerprint but also bubble described above are present on a BD, then it is very difficult to distinguish the fingerprint dots 12 and the core of the bubbles in real time by sensing a decrease in the intensity of the reflected light. For example, suppose when the intensity of the reflected light decreases, it is determined that the core of a bubble has been sensed and the TE signal is held for an amount of time it will take for the light beam to cross the core of the bubble. In that case, the decrease in the intensity of the reflected light could have actually been caused by fingerprint dots, not by the core of the bubble. A fingerprint is often distributed in a much broader area, and at a higher density, than a bubble. That is why if the TE signal were held for a predetermined amount of time when a decrease in the intensity of the reflected light is sensed, the TE signal would be held continuously in the broad area with the fingerprint dots 12 and the combined hold period would be as long as more than 4 ms. And during that long hold period, the light beam would not follow the tracks, thus causing tracking failures with high probability. That is to say, if the hold period were defined to be relatively long to cope with bubbles and if the defect were actually fingerprint dots, not bubbles, then the respective hold periods shown in portion (d) of FIG. 10 would be continuous with each other and the TE signal could not be obtained anymore in the broad area where there are a lot of fingerprint dots.

On the other hand, suppose when the intensity of the reflected light decreases, it is determined that the fingerprint dots have been sensed and the TE signal is held for an amount of time that is short enough for the light beam to cross the fingerprint dots. In that case, the decrease in the intensity of the reflected light could have actually been caused by a bubble, not by the fingerprint dots. In such a situation, the respective hold periods would be much shorter than the amount of time it would take for the light beam to cross the bubble. That is why after such a short hold period has passed, the TE signal would have a pseudo off-track component due to the presence of a bubble and a tracking failure would occur. That is to say, if the tracking control were performed so as to cope with fingerprints, then it would be impossible to prevent tracking failures from being caused by bubbles. To avoid such tracking failures due to a bubble, the TE signal should be held long enough for the light beam to cross the bubble.

As described above, it is difficult to distinguish fingerprint dots and bubble cores from each other in real time. That is why when a defect is detected, the amount of time to hold the TE signal is defined to be an appropriate value for either fingerprint dots or bubbles. However, if the hold period were defined to be an appropriate value for fingerprint dots, tracking failures would be caused easily due to the presence of bubbles. On the other hand, if the hold period were defined to be an appropriate value for bubbles, then tracking failures would be caused easily due to the presence of fingerprint dots.

Hereinafter, it will be described why tracking failures will occur easily due to the presence of fingerprint dots when the conditions are defined so as to prevent tracking failures from being caused by bubbles.

To prevent tracking failures from being caused by bubbles, it is not enough to just hold the TE signal while the intensity of the reflected light is low. The intensity of the reflected light certainly decreases mainly due to the presence of bubble cores. But each of those bubble cores is surrounded with an area that causes a distortion in the TE signal. For that reason, the TE signal should be held for the period of time in which the intensity of the reflected light decreases plus a predetermined amount of extra time. Since that predetermined amount of extra time is much longer than the amount of time it takes for the light beam spot to pass between fingerprint dots, the TE signal is also held between the fingerprint dots. As a result, no appropriate TE signal can be obtained from the fingerprint dots. Also, the area in which a fingerprint dot is present is broader than the area in which a bubble is present. That is why when the hold period passes and the TE signal is taken out of hold, the light beam spot will be still crossing the fingerprint dot. Consequently, the TE signal will be held again immediately. For that reason, if the conditions were set so as to hold the TE signal to avoid the influence of bubbles, the presence of a fingerprint would prevent the TE signal from being obtained between the fingerprint dots. In addition, since the TE signal would be held in a broad area where there is the fingerprint, tracking failure would occur easily.

Unlike fingerprints, bubbles may or may not be produced easily according to the type of the manufacturing process of BDs. Specifically, a BD, which has had its light transmitting layer formed by a spin coating process, tends to have produced a lot of bubbles. Meanwhile, a BD, which has had its light transmitting layer (i.e., protective sheet) attached by a bonding process, tends to have produced lesser bubbles. In this manner, the number of bubbles produced varies significantly according to the type of the manufacturing process of BDs and the material. On the other hand, the sizes of fingerprint dots 12 in a human fingerprint generally fall within a predetermined range. On top of that, a fingerprint is very easily left on the surface of a bare disc that is supposed to be used without being housed in a cartridge.

In view of these considerations, an optical disc apparatus according to the present invention is initially operated with its settings adjusted so as to perform a read operation appropriately even if there is a fingerprint on the surface of a BD. On the other hand, if there is any bubble, the apparatus lets some tracking abnormality such as a tracking failure occur on purpose. But if any tracking failure has occurred due to the bubble while a read/write operation is being performed on the BD, then the apparatus changes the initial settings and retries a read operation under such a condition on which a tracking control can be performed appropriately this time on the BD with the bubble.

Such a change of settings can be done by a tracking condition setting section included in the optical disc apparatus of the present invention. The tracking condition sensing section may set a tracking condition that determines how easily a tracking failure is likely to occur due to a defect and may change the settings if necessary.

In a preferred embodiment of the present invention, when a read operation is performed for the first time on a disc that has just been loaded, the tracking condition setting section sets such a tracking condition that will not cause a tracking failure easily even if there is a fingerprint. However, if any tracking failure has occurred during the first read operation and if a read operation needs to be retried for the second time and so on, then the tracking condition setting section changes the tracking conditions into a one that will not cause a tracking failure easily even when there is a bubble.

The initial setting adopted by the tracking condition setting section is defined so as to avoid the influence of fingerprints by shortening the hold period of the TE signal (including reducing the hold period to zero), for example, thereby getting a tracking control done based on the TE signal even between fingerprint dots. That is why even if there is a fingerprint over a broad area on the disc surface, information about the tracking error can still be obtained properly from the areas between the fingerprint dots and the apparatus can operate without causing tracking failures easily.

With such an initial setting, if there is a bubble, a tracking failure will occur easily due to a pseudo off-track component produced in the TE signal. In the first preferred embodiment of the present invention, however, the apparatus lets such tracking failures occur. That is to say, if a tracking failure has occurred, the defect on the optical disc that would have caused the failure is presumed to be a bubble, not the fingerprint, and the initial setting that has been defined to avoid the influence of fingerprints is changed into a one that will work fine to avoid the influence of bubbles.

According to the present invention, when the tracking conditions are changed from the setting to cope with fingerprints into the one to cope with bubbles, at least one of the following parameters (or tracking conditions) is changed:

(1) hold period of the tracking control;
(2) servo gain of the tracking control; and
(3) rotational velocity of the optical disc (i.e., rotational frequency per unit time)

For example, in a situation where the settings of the tracking condition (1) are changed, if a tracking failure has occurred while a read operation is performed for the first time after the disc has been loaded, then the signal supplied from the tracking control section is held against a bubble when a read operation is retried for the second time and so on. That is to say, during the first read operation, even if the intensity of the reflected light has decreased due to the presence of a fingerprint or a bubble, the tracking control is not suspended but is carried out appropriately against a defect such a fingerprint dot that is smaller in size than the beam spot size (i.e., a first type of defect). However, in a situation where any tracking abnormality such as a tracking failure has occurred as a result, if any defect (i.e., a decrease in the intensity of the reflected light) is sensed during a read operation after that, then the tracking control is suspended. In that case, the hold period is defined to be long enough to cope with the bubble (i.e., a length corresponding to at least the amount of time it will take for the light beam to cross the bubble). In this manner, it is possible to prevent any tracking abnormality such as a tracking failure from occurring even if a pseudo off-track component has been produced due to a defect such as a bubble that is bigger in size than the beam spot size (i.e., a second type of defect).

The optical disc apparatus may include fingerprint detecting means for determining whether or not the defect (i.e., the decrease in the intensity of the reflected light) has been caused by a fingerprint. In that case, if a tracking failure has occurred while a read operation is performed for the first time after the disc has been loaded and if it has been determined that the tracking failure has been caused by a fingerprint, the servo gains of the tracking control and/or the rotational velocities of the optical disc are changed when the read operation is retried for the second time and so on, thereby eliminating the tracking failures (due to a bubble) while the read operation is retried.

As used herein, the "tracking failure" refers to not only a situation where a "track jump" (i.e., unintentional jump of a beam spot from a target track to follow to a wrong track) has occurred but also a situation where the tracking error has increased to exceed a predetermined permissible range.

As can be seen from the foregoing description, the effect of the present invention is achieved in a situation where not only a defect (which is typically a fingerprint dot) that is smaller in size than a light beam spot on the surface of an optical disc but also another defect (which is typically a bubble) that is bigger in size than the light beam spot may be produced on the optical disc. However, the defects do not have to be fingerprints or bubbles. Rather the effect of the present invention is achieved in a situation where any other combination of defects with similar properties may be developed.

If a single optical disc apparatus can be loaded with any combination of multiple types of optical discs compliant with various standards and if an optical disc that may possibly have fingerprints or bubbles is included in those multiple types of optical discs, the present invention can also achieve effects.

Generally speaking, the intensity of the reflected light may decrease due to another type of defect, not just fingerprint dots or bubbles. For example, even if there is dust, dirt or a scratch on the surface of an optical disc, the intensity of the reflected light also decreases. However, the magnitude of the decrease in the intensity of the reflected light due to the presence of dust or a scratch is much greater than a fingerprint or a bubble. That is why dust or a scratch can be detected based on the magnitude of decrease in the intensity of the reflected light. Such defects that would cause a significant decrease in the intensity of the reflected light will be referred to herein as a "third type of defects". If there is a third type of defect on the surface of an optical disc, the intensity of the reflected light will decrease more significantly than a situation where there is a first or second type of defect there. Thus, the third type of defects can be detected independently of the first or second type of defects. If the third type of defect has been detected, the optical disc apparatus of the present invention will operate in the same way as a known one.

Hereinafter, preferred embodiments of an optical disc apparatus according to the present invention will be described with reference to the accompanying drawings.

Embodiment 1

First or all, the arrangement of functional blocks in a first preferred embodiment of an optical disc apparatus according to the present invention will be described with reference to FIG. 1.

Figure 1:
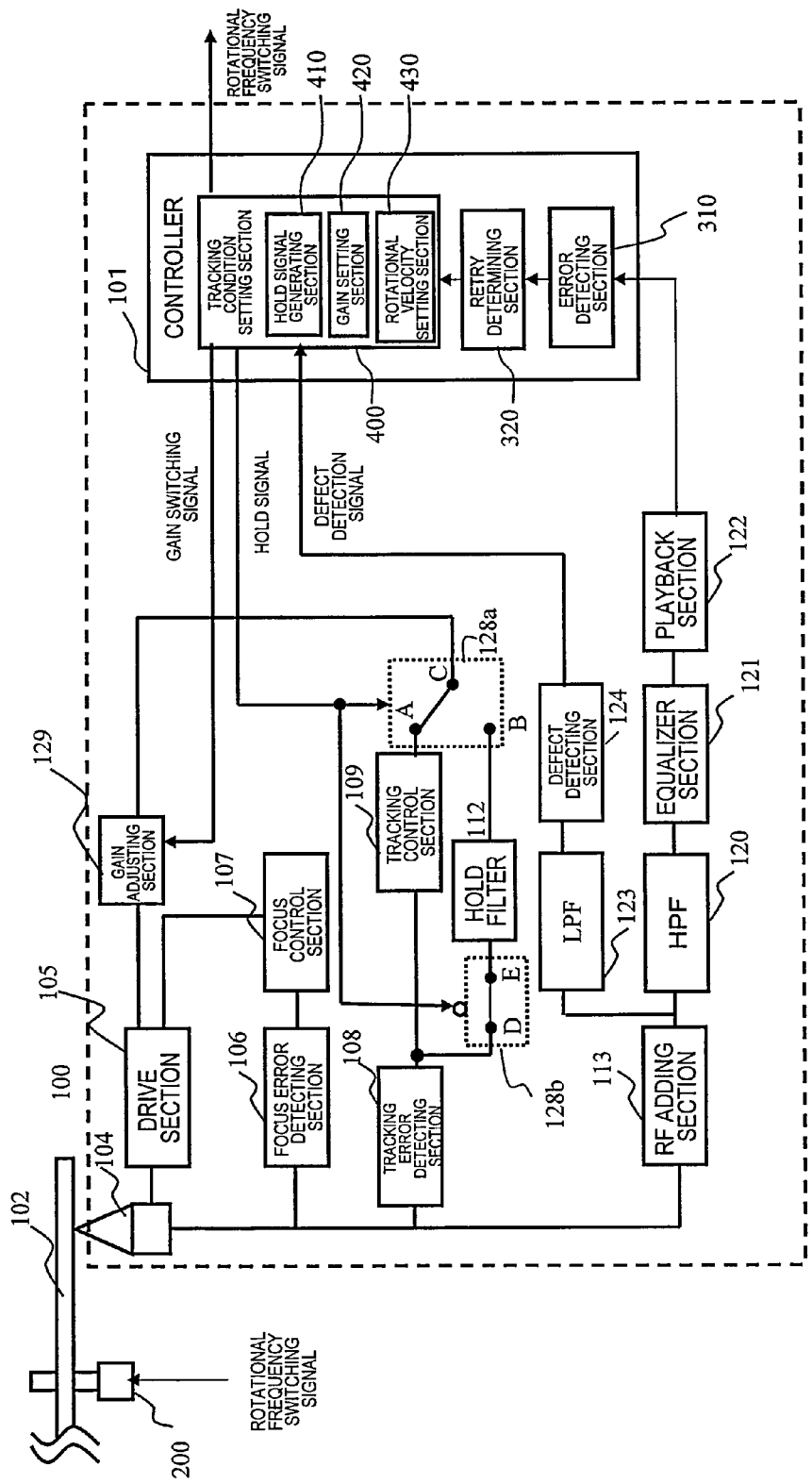
FIG. 1 shows the arrangement of functional blocks in an optical disc apparatus according to the present invention.

As shown in FIG. 1, the optical disc apparatus 100 of this preferred embodiment includes a focus error detecting section 106, a focus control section 107, a tracking error detecting section 108 and a tracking control section 109.

The optical disc apparatus 100 shown in FIG. 1 includes an optical pickup 104 for converging a light beam on the information layer of an optical disc 102, a drive section 105 for moving the light beam along the radius of the optical disc 102, the focus error detecting section 106, the focus control section 107, the tracking error detecting section 108 and the tracking control section 109.

In reading or writing data from/on the optical disc 102, the focus error detecting section 106 generates an FE signal based on the output signal of the optical pickup 104. In the same way, the tracking error detecting section 108 generates a TE signal.

The focus control section 107 performs a gain compensation and a phase compensation on the FE signal and then performs a PWM modulation or current amplification, thereby driving the drive section 105. Meanwhile, the tracking control section 109 performs a gain compensation and a phase compensation on the TE signal and then performs a PWM modulation or current amplification, thereby driving the drive section 105, too.

In accordance with the outputs of the focus control section 107 and the tracking control section 109, the drive section 105 drives an objective lens (not shown) in the optical pickup 104 perpendicularly to the surface of the disc and along the radius of the disc, thereby getting a focus control and a tracking control done.

The data stored on the optical disc 102 is read by the optical pickup 104 and then input to a high-pass filter (HPF) 120 and a low pass filter (LPF) 123 by way of an RF signal adding section 113.

After having passed through the HPF 120, the RF added signal is sent to a playback section 122 by way of an equalizer section 121. In the playback section 122, the RF added signal is subjected to binarization, PLL, error correction, demodulation and other types of processing, thereby obtaining a read signal, which is then output to a host computer (not shown) via a predetermined interface (not shown, either).

Meanwhile, the RF added signal that has passed through the LPF 123 is input to a defect detecting section 124, which can generate and output a defect detection signal, having a waveform representing the presence or absence of fingerprints, bubbles or any other defects on the optical disc 102, based on the output of the LPF 123. More specifically, on finding the output of the LPF 123 lower than a reference level, the defect detecting section 124 determines that the light beam is crossing some type of defect on the optical disc 102. Since the intensity of the light reflected from the optical disc decreases while the light beam is crossing some type of defect on the optical disc 102, the defect can be detected on sensing such a drop in the output of the LPF 123.

The output of the defect detecting section 124 is supplied to a tracking condition setting section 400 in a controller 101. The tracking condition setting section 400 includes a hold signal generating section 410, a gain setting section 420 and a rotational velocity setting section 430.

The hold signal generating section 410 supplies a hold signal to switches 128a and 128b and turns the switches 128a and 128b, thereby controlling the connected and disconnected states between terminals A and C, terminals B and C, and terminals D and E. More specifically, when the hold signal is Low, the terminals A and C are connected together, the terminals B and C are disconnected from each other, and the terminals D and E are connected together. On the other hand, when the hold signal is High, the terminals A and C are disconnected from each other, the terminals B and C are connected together, and the terminals D and E are disconnected from each other.

While a normal tracking control is performed, the hold signal is supposed to be Low to connect the terminals A and C together and disconnect the terminals B and C from each other. In that case, the output of the tracking control section 109 is supplied to the drive section 105 by way of the gain adjusting section 129. As a result, the tracking control is carried out to minimize the tracking error.

In this preferred embodiment, the initial settings are done such that the hold signal remains Low even if any defect has been detected. Such settings define a tracking condition that can minimize the influence of fingerprints. That is to say, a tracking condition that would not suspend a tracking control even if the intensity of the reflected light decreased due to the presence of fingerprint dots (i.e., hold period=zero) is defined as the initial condition. It will take just a short time for the light beam to cross each fingerprint dot (i.e., the first type of defect) and the spot size of the light beam is not significantly different from the average pitch of the fingerprint dots. That is why even if the settings are defined so as not to hold the TE signal, an appropriate TE signal can still be obtained between the fingerprint dots.

On the other hand, if the tracking condition to cope with fingerprints is changed into a tracking condition to cope with bubbles, the hold signal is supposed to be kept High for a predetermined period of time responsive to the detection of a defect, thereby disconnecting the terminals A and C from each other, connecting the terminals B and C together, and disconnecting the terminals D and E from each other during that period. As a result, while the light beam is crossing a bubble, the tracking control can be put on hold and it is possible to prevent a tracking failure from being caused by the bubble.

The gain setting section 420 supplies a gain switching signal to the gain adjusting section 129, thereby changing the servo gains of the tracking control. If the tracking condition to cope with bubbles is adopted, then the gain is reduced to decrease a transient response to the bubble. In this manner, settings can be defined so as not to cause tracking failures easily due to the presence of the bubble.

The rotational velocity setting section 430 supplies a rotational frequency switching signal to the disc motor 200, thereby changing the rotational velocities of the optical disc 102. If the tracking condition to cope with bubbles is adopted, then the rotational velocity of the optical disc 102 is increased to shorten the time it takes for the light beam to pass a bubble. In this manner, settings can be defined so as not to cause tracking failures easily due to the presence of the bubble.

Unless a defect detection signal is input to the tracking condition setting section 400 in a situation where it has been determined that a retry read operation should be carried out, the tracking conditions during the retry read operation are preferably not changed.

The controller 101 further includes an error detecting section 310 that receives the output of the playback section 122 and a retry determining section 320 in addition to the tracking condition setting section 400. If the quality of the read signal is so bad that the error cannot be corrected anymore or that the PLL or servo control has caused a failure, the error detecting section 310 detects a read error and notifies the host computer (not shown) of that read error. In that case, in response to the host computer's request and according to the status of the optical disc apparatus, the retry determining section 320 determines whether a retry read operation should be carried out or not. If the retry determining section 320 has determined that the retry read operation should be carried out, then a retry instruction is given to the tracking condition setting section 400.

And if it has been determined that the retry read operation should be carried out and if the defect detection signal has been input to the tracking condition setting section 400, then the tracking conditions are changed to carry out the retry read operation properly. More specifically, each of the hold signal generating section 410, the gain setting section 420 and the rotational velocity setting section 430 in the tracking condition setting section 400 has at least one of its settings changed to perform the retry read operation appropriately.

Next, an exemplary hardware configuration to implement the respective functional blocks shown in FIG. 1 will be described with reference to FIG. 2A.

Figure 2A:
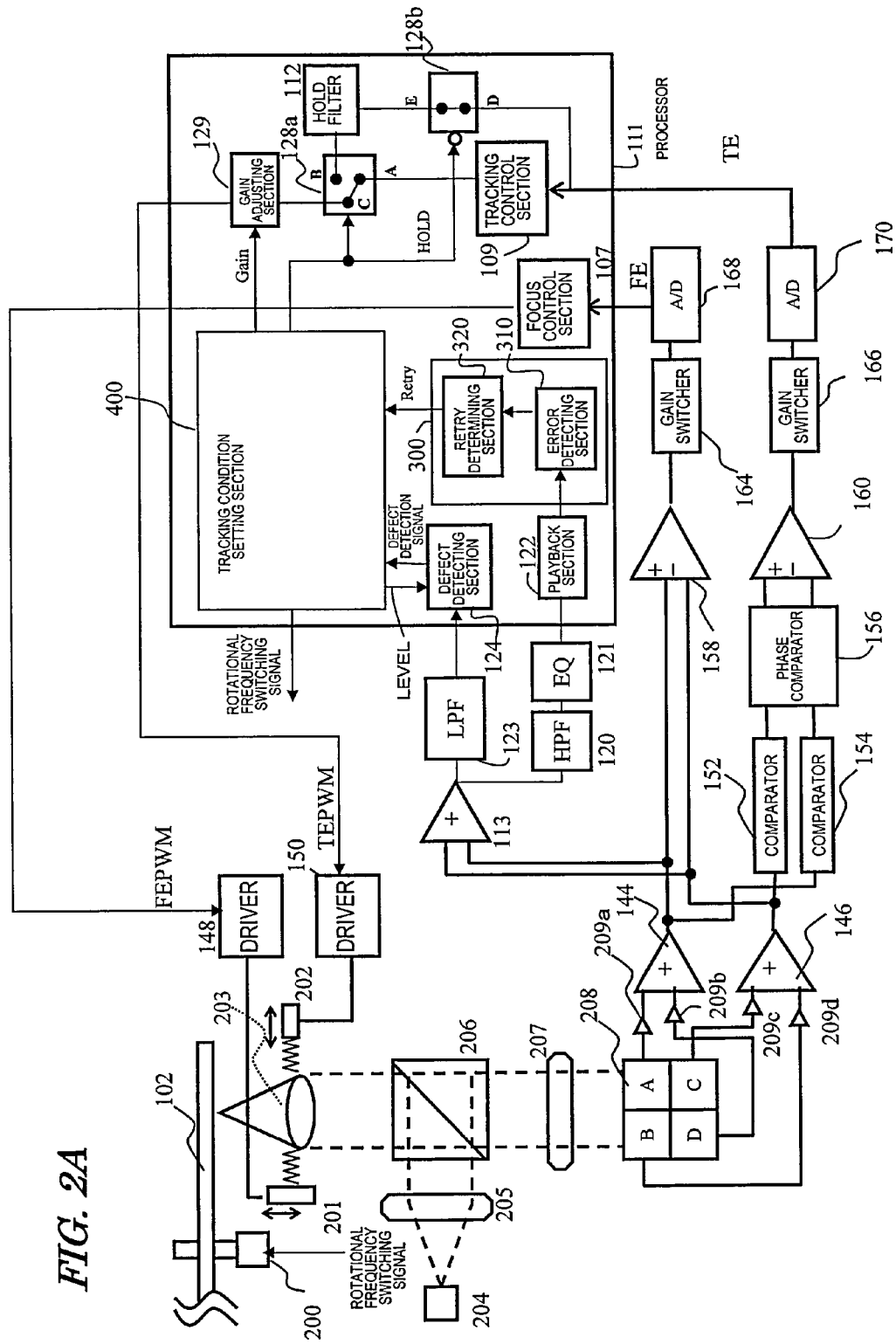
FIG. 2A shows an exemplary hardware configuration that implements the functional block shown in FIG. 1.

The optical pickup 104 shown in FIG. 1 includes a light source 204, a coupling lens 205, a polarization beam splitter 206, an objective lens 203, a condenser lens 207 and a photodetector 208 as shown in FIG. 2A.

The light source 204 is preferably a semiconductor laser diode, which emits a light beam with a wavelength of 415 nm or less in this preferred embodiment. The light beam emitted from the light source 204 is linearly polarized light, of which the polarization direction can be arbitrarily controlled by turning the light source 204 around the optical axis of the light beam emitted. The coupling lens 205 transforms the light beam that has been emitted from the light source 204 into a parallel beam, which is then incident on the polarization beam splitter 206. The polarization beam splitter 206 has such a property as to reflect linearly polarized light that is polarized in a particular direction but to transmit linearly polarized light that is polarized perpendicularly to that particular direction. The polarization beam splitter 206 of this preferred embodiment is designed so as to reflect the light beam that has been transformed by the coupling lens 205 into the parallel beam toward the objective lens 203. The objective lens 203 converges the light beam that has been reflected by the polarization beam splitter 206, thereby forming a light beam spot on the information layer of the optical disc 202.

To have the light beam spot follow the target track on the information layer of the optical disc 102 that is being turned at a predetermined velocity by the disc motor 200, a TE signal representing the magnitude of a tracking error and an FE signal representing the magnitude of a focus error need to be generated based on the light beam that has been reflected from the optical disc 102.

The light beam that has been reflected from the optical disc 102 is transformed by the objective lens 203 into a parallel light beam, which is then incident on the polarization beam splitter 206. In this case, the light beam has had its polarization direction rotated 90 degrees with respect to the polarization direction of the light beam that was incident on the optical disc 102. That is why the light beam is transmitted through the polarization beam splitter 206 and then incident on the photodetector 208 as it is by way of the condenser lens 207.

The photodetector 208 receives the light that has passed through the condenser lens 207 and converts the light into an electrical signal (specifically, a current signal). The photodetector 208 shown in FIG. 2A has its photosensitive plane divided into four areas A, B, C and D, each of which outputs an electrical signal representing the intensity of the light received there.

Preamplifiers 209a, 209b, 209c and 209d convert the current signals, supplied from the photodetector 208, into voltage signals. Adders 144 and 146 calculate the sums of the voltage signals supplied from the preamplifiers 209a, 209b,

209c and 209d diagonally on the photodetector 208. More specifically, the adder 144 may output a sum signal A+D, of which the magnitude corresponds with the sum of the outputs of the areas A and D, while the adder 146 may output a sum signal B+C, of which the magnitude corresponds with the sum of the outputs of the areas B and C, for example. Alternatively, other signals may also be generated if the sums are calculated differently.

The differential amplifier 158 receives the outputs of the adders 144 and 146 and outputs an FE signal, which is a signal for controlling the optical pickup such that the light beam has a predetermined converging state on the information layer of the optical disk 102. The FE signal may be detected by any method—by an astigmatism method, a knife edge method or even a spot sized detection (SSD) method. The circuit configuration may be changed appropriately according to the detection method adopted. A gain switcher 164 adjusts the amplitude of the FE signal to a predetermined value. An A/D converter 168 converts the FE signal supplied from the gain switcher 164 into a digital signal.

Meanwhile, comparators 152 and 154 digitize the output signals of the adders 144 and 146, respectively. A phase comparator 156 compares the phases of the output signals of the comparators 152 and 154 to each other. A differential amplifier 160 receives the output signal of the phase comparator 156 and outputs a TE signal, which is used to perform a control operation that makes the light beam follow the right track on the optical disk 102. The method of detecting the TE signal is not particularly limited, and a phase difference method, a push-pull method or a three-beam method may be adopted. And according to the detection method adopted, the circuit configuration is modified appropriately. A gain switcher 166 adjusts the amplitude of the TE signal to a predetermined value. An A/D (analog-to-digital) converter 170 converts the TE signal supplied from the gain switcher 166 into a digital signal.

The FE and TE signals that have been generated by these circuits are input to a processor, which may be a digital signal processor (DSP) corresponding to the controller 101 shown in FIG. 1. As shown in FIG. 2A, the processor 111 includes the focus control section 107, the tracking control section 109, the HOLD filter 112, the playback section 122, the defect detecting section 124, the switches 128a, 128b, the gain adjusting section 129, a control section 300 and the tracking condition setting section 400. The control section 300 includes the error detecting section 310 and the retry determining section 320.

The operation of the processor 111 will be described in detail later.

A control signal FEPWM for focus control and a control signal TEPWM for tracking control are output from the processor 111 to drivers 148 and 150, respectively.

In accordance with the control signal FEPWM, the driver 148 drives the focus actuator 201, which moves the objective lens 203 substantially perpendicularly to the information layer of the optical disc 102. On the other hand, in accordance with the control signal TEPWM, the driver 150 drives the tracking actuator 202, which moves the objective lens 203 substantially parallel to the information layer of the optical disc 102.

The photodetector 208, preamplifiers 209a through 209d, adders 144, 146, comparators 152, 154, phase comparator 156, differential amplifier 160, gain switcher 166, A/D converter 170, processor 111, driver 150 and tracking actuator 202 together form a tracking controller for performing a tracking control. Meanwhile, the photodetector 208, preamplifiers 209a through 209d, adders 144, 146, differential amplifier 158, gain switcher 164, A/D converter 168, processor 111, driver 148 and focus actuator 201 together form a focus controller for performing a focus control.

The photodetector 208, preamplifiers 209a through 209d, adders 144, 146 and differential amplifier 158 shown in FIG. 2A are equivalent to the focus error detecting section 106 shown in FIG. 1. And the driver 148 and focus actuator 201 are equivalent to the drive section 105 shown in FIG. 1.

The all-sum signal (A+B+C+D) of the areas A, B, C and D of the photodetector 208 is generated by getting the output (A+D) of the adder 144 and the output (B+C) of the adder 146 added together by the RF adding section 113. Then, the all-sum signal (A+B+C+D) is passed as an RF added signal to the LPF 123.

The RF added signal has its high frequency components filtered out by the LPF 123 and then is passed to the defect detecting section 124 in the processor 111. The defect detecting section 124 performs binarization and shaping by comparing the amplitude level of the all-sum signal to a reference level that has been defined in advance. For example, the all-sum signal may be binarized such that an amplitude level of the all-sum signal that is lower than the reference level is "High" and that an amplitude level of the all-sum signal that is equal to or higher than the reference level is "Low". The amplitude level of the all-sum signal decreases when the light beam crosses a fingerprint dot 12 or a bubble. For that reason, by setting the reference level to an appropriate level, the fingerprint dot 12 or the bubble can be detected. The defect detection signal is output from the defect detecting section 124 to the tracking condition setting section 400 in the processor 111.

Hereinafter, the configuration and operation of the processor 111 will be described in further detail with reference to FIG. 2B.

As described above, according to the present invention, if the tracking conditions need to be changed from the settings to cope with fingerprints into the ones to cope with bubbles, then (1) the hold periods of the tracking control, (2) the servo gains of the tracking control, and/or (3) the rotational velocities (i.e., the rotational frequencies per unit time) of the optical disc are changed. These settings may be defined and changed by the tracking condition setting section 400 with the configuration shown in FIG. 2B.

Hereinafter, it will be described first how the tracking condition setting section 400 changes the hold periods of the tracking control.

Figure 2B:
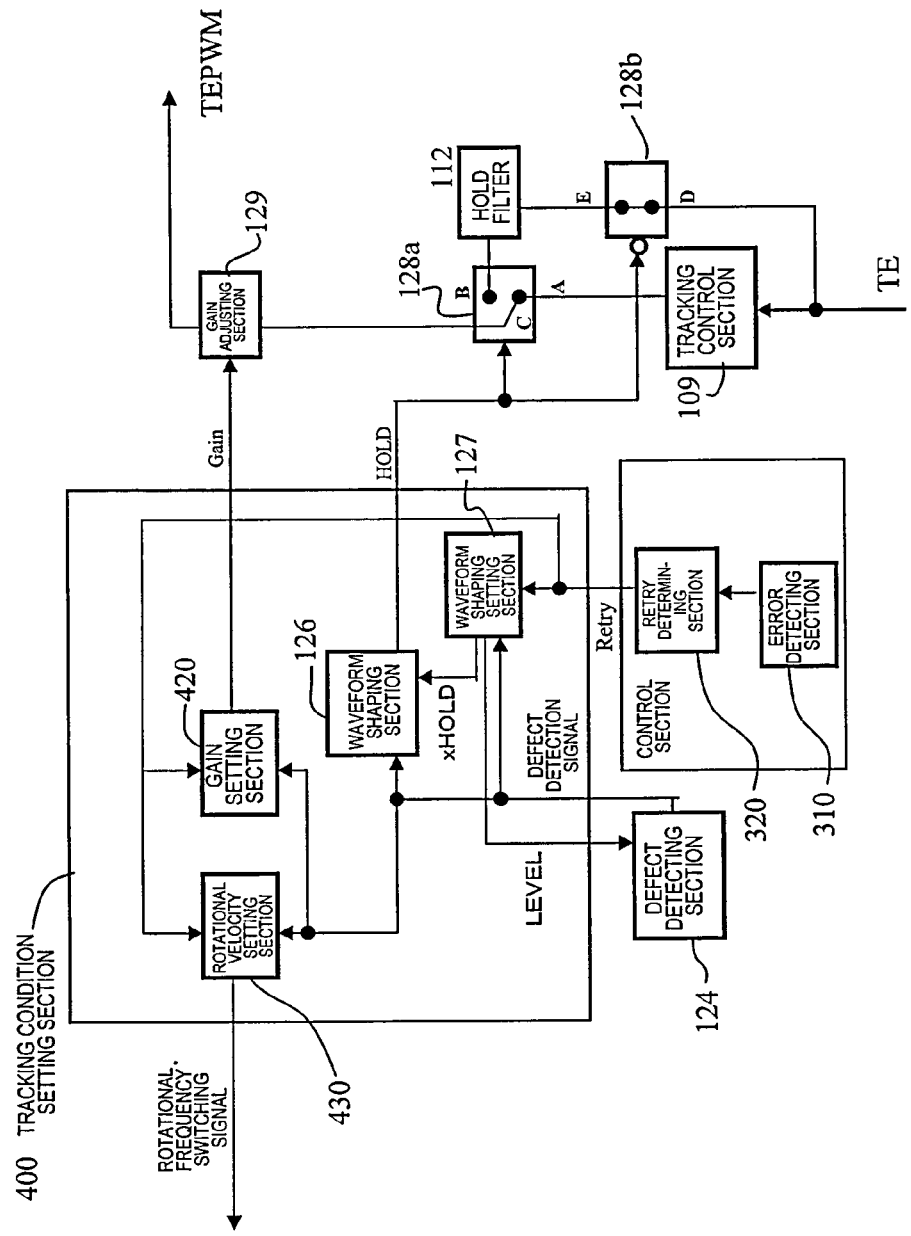
FIG. 2B shows an exemplary configuration for the tracking condition setting section 400 shown in FIG. 2A.

As shown in FIG. 2B, the tracking condition setting section 400 includes a waveform shaping section 126 and a waveform shaping setting section 127 functioning as the hold signal generating section 410 shown in FIG. 1. To define the waveform of the hold signal, the waveform shaping setting section 127 generates an xHOLD signal and supplies it to the waveform shaping section 126. The waveform shaping setting section 127 also generates a LEVEL signal and passes it to the defect detecting section 124.

The waveform shaping section 126 generates a tracking control hold signal based on the defect detection signal and outputs it. If the hold signal generated by the waveform shaping section 126 rises from Low level to High level, the control signal TEPWM for tracking control is put on hold at a constant level while the hold signal is High. On the other hand, if the hold signal falls from High level to Low level, the hold is released and a normal tracking control is resumed. Hereinafter, this point will be described in further detail.

In this preferred embodiment, the hold signal controls the states of the switched 128a and 128b, and if the hold signal is High, the HOLD filter 112 holds the TE signal. On the other hand, if the hold signal is Low (i.e., negated), then the switch 128a connects the terminals A and C together, and therefore, a normal tracking control is carried out. In that case, since the switch 128b connects the terminals E and D together, the output of the tracking error detecting section 108 shown in FIG. 1 (i.e., the TE signal) is input to the HOLD filter 112 by way of the switch 128b. The HOLD filter 112 is normally limited to the band of the rotational frequency of the optical disc and extracts error components caused by rotation (such as eccentricity). And while the hold signal is High, the TE signal is maintained at a predetermined level and the tracking control can be put on hold.

The optical disc apparatus of this preferred embodiment is designed so as to hold the TE signal that is the output of the tracking error detecting section 108 by connecting the switches 128a, 128b and HOLD filter 112 to the tracking error detecting section 108. However, the present invention is in no way limited to that specific preferred embodiment. Alternatively, the switches 128a, 128b and the HOLD filter 112 may also be arranged between the gain adjusting section 129 and the driver 105, for example. In that case, a configuration for holding the drive signal to be supplied to the tracking actuator 202 shown in FIG. 2A by appropriately controlling the characteristic of the HOLD filter 112 is adopted to achieve similar effects. That is why when we say "to hold a tracking error signal", it means herein not only holding the tracking error signal itself but also holding another signal that changes with the tracking error signal and that controls the drive of the tracking actuator 202.

In the optical disc apparatus of this preferred embodiment, initial settings are done by the tracking condition setting section 400 such that even if the output of the LPF 123 includes a signal representing either a fingerprint dot or a bubble, the hold signal remains Low. That is to say, even if there is a fingerprint or a bubble on the optical disc 102, the tracking control signal TEPWM is not held when the light beam crosses that defect for the first time. But if any abnormality such as a tracking failure has occurred as a result, the hold signal will become High in accordance with the output of the defect detecting section 124 when a retry read operation is performed next time.

The waveform shaping section 126 performs various types of waveform shaping on the output of the defect detecting section 124 based on the setting of the waveform shaping setting section 127, thereby generating the hold signal described above. If the settings to be transferred from the waveform shaping setting section 127 to the waveform shaping section 126 are changed in response to the xHOLD signal, then the waveform shaping section 126 can generate hold signals with multiple different waveforms from the defect detection signal with the same waveform. According to this preferred embodiment, thanks to these functions of the defect detecting section 124, the waveform shaping section 126 and the waveform shaping setting section 127, it can be changed quickly whether or not to put the tracking control on hold against the same defect when a read operation is performed for the first time and when the read operation is retried for the second time and so on.

Next, the waveforms of various signal to be generated in the optical disc apparatus of this preferred embodiment when the light beam passes a fingerprint or a bubble on a BD will be described with reference to FIG. 3.

Portion (a) of FIG. 3 shows the waveform of the output of the RF adding section 113 (i.e., the RF added signal) when the light beam spot 10 crosses the fingerprint dots 12. Portion (b) of FIG. 3 shows the waveform of the output of the LPF 123. Portion (c) of FIG. 3 shows the waveform of the signal that has been binarized and shaped by the defect detecting section 124 (i.e., the defect detection signal). And portion (d) of FIG. 3 shows the waveform of the hold signal that is the output of the waveform shaping section 126.

On the other hand, portion (e) of FIG. 3 shows the waveform of the output of the adding section 113 (i.e., the RF added signal) when the light beam spot 10 crosses the bubble 14 and its core 14a. Portion (f) of FIG. 3 shows the waveform of the output of the low pass filter (LPF) 123. Portion (g) of FIG. 3 shows the waveform of the signal that has been binarized and shaped by the defect detecting section 124 (i.e., the defect detection signal). And portion (h) of FIG. 3 shows the waveform of the hold signal that is the output of the waveform shaping section 126.

Portion (i) of FIG. 3 shows the waveform of the TE signal when the light beam spot 10 passes the fingerprint. Portion (j) of FIG. 3 shows the waveform of the TE signal during initial setting. And portion (k) of FIG. 3 shows the waveform of the TE signal after the settings have been changed into the ones to cope with bubbles.

The diameter of the light beam spot 10 on a BD is approximately a quarter to a fifth as large as that of the light beam spot 10 on a DVD, and is close to the size of the fingerprint dots 12 or the interval between the dots as described above. That is why when the light beam spot 10 crosses the fingerprint, the amplitude of the RF added signal representing the reflected light changes as shown in portion (a) of FIG. 3. The amplitude of the output of the RF adding section decreases because the intensity of the reflected light decreases when the light beam spot 10 crosses the respective fingerprint dots 12 that form the fingerprint. However, if the diameter of the light beam spot 10 were as large as the one on a DVD, then multiple fingerprint dots 12 would always be included in the single light beam spot 10. In that case, the decrease in the amplitude of the RF added signal could not be detected anymore every time a fingerprint dot 21 is passed.

Portion (b) of FIG. 3 shows the output of the LPF, i.e., what the signal shown in portion (a) of FIG. 3 is like when passing through the LPF 123. If the output of the LPF is binarized by comparing it to a reference detection level that is defined by the LEVEL signal, a defect detection signal, having a waveform representing the fingerprint dots 12, can be obtained as shown in portion (c) of FIG. 3. This defect detection signal is output from the defect detecting section 124 to the waveform shaping section 126.

The waveform shaping section 126 of this preferred embodiment shapes the waveform of the defect detection signal shown in portion (c) of FIG. 3, thereby generating the hold signal shown in portion (d) of FIG. 3. That is to say, in accordance with the xHOLD signal transferred from the waveform shaping setting section 127 to the waveform shaping section 126, the waveform shaping section 126 performs waveform shaping such that the pulse width of the defect detection signal (corresponding to the length of the hold period) becomes equal to zero.

In this manner, according to this preferred embodiment, the hold signal generated has such a waveform that has been shaped by removing the pulses representing the fingerprint dots 12 from the defect detection signal generated when the light beam spot 10 crossed the fingerprint. This means that the waveform shaping section 126 ignores the fingerprint dots 12, i.e., the tracking control is not put on hold against the fingerprint dots 12. As a result, a normal tracking error signal is generated as shown in portion (i) of FIG. 3 and a tracking control is continued in accordance with the tracking error signal.

On the other hand, since the bubble 14 is bigger than the fingerprint dot 12, the amplitude of the RF added signal decreases more steeply and for a relatively long period of time around the core 14a of the bubble 14 as shown in portion (e) of FIG. 3. If such an RF added signal passes through the LPF 123, the LPF output shown in portion (f) of FIG. 3 is obtained.

If the LPF signal shown in portion (f) of FIG. 3 is binarized by the defect detecting section 124, then a defect detection signal, of which the waveform represents the size of the bubble 14, can be obtained as shown in portion (g) of FIG. 3. If such a defect detection signal is input to the waveform shaping section 126 and subjected to predetermined waveform processing, the hold signal shown in portion (h) of FIG. 3 is generated. This hold signal remains High for a longer period of time than the time it takes for the light beam spot 10 to pass the bubble 14. And this High state period defines the tracking control hold period.

The hold signal shown in portion (h) of FIG. 3 can be obtained by defining the hold period to fall within the range of 100 µs to 300 µs, for example, in accordance with the xHOLD signal supplied from the waveform shaping setting section 127 to the waveform shaping section 126. Should this xHOLD signal define the hold period to be equal to zero, the hold signal would have no pulses as shown in portion (d) of FIG. 3 even if the defect detection signal had the waveform shown in portion (g) of FIG. 3.

As can be seen easily from the foregoing description, according to this preferred embodiment, the modes of waveform shaping are changed in accordance with the xHOLD signal, thereby generating or not generating a hold signal in response to the detection of any defect.

Hereinafter, it will be described with reference to the flowchart shown in FIG. 4A how to perform read processing in this preferred embodiment.

First of all, after the optical disc apparatus of this preferred embodiment has been loaded with a BD, a read operation on the BD is started in Step S1. Since this is the first time the read operation is performed, settings are done in Step S2 so as to generate no hold signal even if any defect such as a fingerprint or a bubble is detected. Specifically, an xHOLD signal is supplied from the waveform shaping setting section 127 shown in FIG. 2B to the waveform shaping section 126, thereby setting the hold period to be equal to zero. As a result, even if a defect detection signal such as the one shown in portion (c) or portion (g) of FIG. 3 is supplied from the defect detecting section 124 to the waveform shaping section 126, the output of the waveform shaping section 127 becomes always equal to zero as shown in portion (d) of FIG. 3. Under such settings, a read operation is performed on the optical disc so as not to put the tracking control on hold even if any fingerprint or bubble is detected.

In this preferred embodiment, the tracking servo gain may be set to be any of three different levels H, M and L. In Step S3, the servo gain is set to be the medium level M. However, the servo gain may also be set to be any arbitrary value by the gain switcher 166 shown in FIG. 2B.

In cases of BDs, the size of a beam spot on the disc surface is so much smaller than fingerprint dots that it takes just a short time for the light beam spot to pass each fingerprint dot and the intensity of the reflected light varies at high frequencies. That is why if the servo gain of the gain adjusting section 129 is set to be an initial value so as to catch up with the eccentricity or vibrations of the optical disc, the tracking servo control will not respond to the high-frequency variation in the intensity of the reflected light even when the light beam spot crosses a fingerprint, and will not be affected by the fingerprint.

Under such initial settings, even if there is any fingerprint, a normal TE signal can still be obtained as shown in portion (i) of FIG. 3 and the light beam spot can still follow the tracks with no problem. However, if there were any bubble in the optical disc and if the light beam spot crossed that bubble, then a significant tracking error could be caused due to a pseudo off-track component to be produced in the TE signal by the bubble and a read error could be caused.

Next, the optical disc 102 is turned at a predetermined velocity by the disc motor 200, thereby forming a light beam spot on the information layer of the optical disc 102. A focus control and a tracking control are carried out such that the light beam spot can follow target tracks on the information layer of the optical disc 102 being rotated at the predetermined velocity by the disc motor 200.

Next, a read operation is performed on a particular single track in Step S4 and then it is determined in Step S5 whether a read error has occurred or not. If any read error has occurred, then it is determined in Step S6 whether the read operation has been performed for the second time or not. If the answer is NO (i.e., if the read error occurred while the read operation was performed for the first time), then the settings of waveform shaping are changed in Step S8 to change settings before performing the read operation for the second time (i.e., performing a retried read operation). That is to say, the settings of the waveform shaping section 126 are adjusted so as to put the tracking control on hold for a sufficiently long time in response to the detection of any defect. More specifically, the xHOLD signal is supplied from the waveform shaping setting section 127 to the waveform shaping section 126, thereby generating a hold signal that becomes High for only a predetermined period of time after the defect has been detected as shown in portion (h) of FIG. 3. This predetermined period of time corresponds to the amount of time (of 100 µs to 300 µs, for example) for the light beam spot to pass a bubble of an average size (of approximately 0.5 mm to 1 mm, for example).

If the retried read operation is performed under such conditions, a pseudo off-track component such as the one shown in portion (j) of FIG. 3 will be produced due to a bubble in the TE signal. That is why if the light beam spot tried to follow that pseudo off-track component, then a track jump would occur. However, the tracking control is put on hold in accordance with the defect detection signal during the retried read operation. As a result, the signal to be input to the driver 150 shown in FIG. 2A will not take the pseudo off-track component into consideration as shown in portion (k) of FIG. 3. Consequently, the magnitude of the tracking error when the light beam passes the bubble will decrease so much as to get the read operation done properly.

As described above, when a read operation is performed for the first time, the conditions of the read operation are defined so as to avoid the influence of fingerprints easily. If any tracking abnormality such as a track jump has still occurred during the read operation in spite of such settings, then the settings will be changed so as to cope with bubbles when the read operation is performed for the second time (i.e., when a retried read operation is performed).

If the read rate of the optical disc is lower than the transfer rate, there is plenty of time to get such a retried read operation done. A BD-ROM Video disc requires a transfer rate of 72 Mbps and a read rate of 50 Mbps or less. Meanwhile, with a BD-R disc or a BD-RE disc, a BS Digital broadcast content that was recorded at a rate of approximately 24 Mbps should be played back at a rate of 36 Mbps or more. For that reason, with any of these optical discs, even if a retried read operation is supposed to be performed in a situation where there is any bubble as a defect in the optical disc, the delay will rarely be so long as to make the user feel uncomfortable.

If it has been determined in Step S5 shown in FIG. 4A that no read error has occurred, then the read operation is continued as it is. Also, if it has been determined in Step S6 that this is the second time the read operation has been performed, then the process advances to Step S9 to post an alert of a read error and stop the read operation.

In the preferred embodiment described above, the tracking control hold periods are changed between the first read operation and the retried read operation, thereby getting the retried read operation done so as to cope with bubbles. Alternatively, the retried read operation to cope with bubbles may also get done by raising or lowering the LEVEL shown in portions (b) and (f) of FIG. 3 without changing the hold periods.

As described above, the LEVEL signal supplied from the waveform shaping setting section 127 to the defect detecting section 124 is a signal that defines a reference level for binarization to be carried out by the defect detecting section 124. If the binarization reference level is raised or lowered by changing the LEVEL signal, then the pulse width of the output signal of the defect detecting section 124 can be adjusted or noise pulses, of which the widths are short of a predetermined time width, may be removed. Alternatively, if the binarization reference level is set so as to ignore a decrease in the intensity of the reflected light due to a fingerprint or a bubble when a read operation is performed for the first time but if the reference level is raised when the read operation is performed for the second time and so on, then a defect detection signal, of which the waveform represents the fingerprint or the bubble, can also be generated.

As described above, the hold signal to be output when the intensity of the reflected light decreases can have its waveform adjusted by at least one of the xHOLD signal and the LEVEL signal. That is why it can be determined adaptively, depending on whether this is the first time the read operation is performed or this is a retried read operation, whether or not to put the tracking control on hold when any defect is detected.

It is theoretically possible to distinguish fingerprint dots from bubbles by combining the functions of the defect detecting section 124, the waveform shaping section 126 and the waveform shaping setting section 127. Actually, however, it is difficult to distinguish them from each other in real time. For that reason, in this preferred embodiment, even if any fingerprint or bubble has been detected, the tracking control is not put on hold during the initialization.

Nevertheless, it is possible to determine, based on the defect detection signal, whether a tracking failure has occurred due to the presence of a fingerprint or not. And based on the result of this decision, it is possible to determine what settings need to be changed during the retried read operation. Such an optical disc apparatus will be described later as a second preferred embodiment of the present invention.

Gain and Rotational Velocity

The optical disc apparatus of the preferred embodiment described above carries out initialization so as to get the tracking done with good stability even if there is any fingerprint on the disc. That is to say, the magnitude of the servo gain is defined to be a normal one so as to keep up with the eccentricity or vibrations of the optical disc. With such a servo gain, however, when the light beam spot crosses a bubble, the servo system will respond to a pseudo off-track component of the TE signal because the light transmitting layer of the optical disc is locally raised around the core of the bubble. To avoid such a response, in the example described above, the tracking control is put on hold before the pseudo off-track component is produced. Alternatively, the response to the pseudo off-track component can also be delayed by decreasing the servo gain of the tracking control.

In this alternative preferred embodiment, if a tracking failure has occurred while a read operation is performed for the first time and if the presence of a bubble has been sensed from that fact, then the tracking condition setting section 400 works so as to change not only settings about a hold on the tracking control but also the magnitudes of the servo gain as well. That is to say, when the read operation is performed for the first time, the servo gain of the tracking control is defined so as not to respond to the fingerprint dots but to keep up with the vibrations or the out-of-plane vibrations (or disc flutter) of the optical disc. And when the read operation is performed for the second time and so on (i.e., when a retried read operation is performed) after a tracking failure has occurred during the first read operation, the gain setting section 420 shown in FIG. 2B gives a gain change instruction (Gain) to the gain adjusting section 129, thereby reducing the gain of the tracking servo and eliminating the transient response to the pseudo off-track component representing the bubble.

FIG. 4B shows the flow of this preferred embodiment. Unlike the flow shown in FIG. 4A, if a read error occurs during the first read operation (i.e., if the answer to the query of Step S6 is NO), then the process advances to Step S7, in which the servo gain of the tracking control is decreased from the initial value M into L. In the other respects, the procedure shown in FIG. 4B is the same as the one shown in FIG. 4A that has already been described for the first preferred embodiment. Thus, the description thereof will be omitted herein to avoid redundancies.

In a situation where the servo gain has as low a value during the retried read operation as in this preferred embodiment, even if there is a bubble in the optical disc, the tracking servo will not respond to the pseudo off-track component produced by the bubble and the light beam can still keep following approximately the centerline of the tracks. FIG. 11(a) shows the waveform of a TE signal in a situation where the gain of the tracking servo is relatively high, while FIG. 11(b) shows the waveform of a TE signal in a situation where the gain is relatively low. As can be seen from FIG. 11, if the gain is decreased, the amplitude of the pseudo off-track component to be produced when the same bubble is passed also decreases.

The same effect can also be achieved even by getting the rotational velocity of the optical disc increased by the rotational velocity setting section 430 during the retried read operation. The higher the rotational velocity of the optical disc, the shorter the time it takes for the light beam spot to pass a bubble. For example, if the optical disc is rotating at a velocity that is 1.5 times as high as the standard velocity, the time it takes for the light beam to cross a bubble (which will be referred to herein as "passage time") is shortened to two-thirds compared to a situation where the optical disc is rotating at the standard velocity. Once the passage time has been shortened in this manner, even if a pseudo off-track component was caused by the bubble, the tracking servo would not respond to that component, thus reducing the probability of occurrence of tracking failures.

Embodiment 2

A tracking signal obtained from an interval between the fingerprint dots is effective as described above. That is why every time a fingerprint dot 12 is detected, a pulse of the defect detection signal can be generated as shown in FIG. 3. Thus, by counting the number of pulses of the defect detection signal (i.e., the number of the fingerprint dots detected) and by determining whether or not the number of pulses detected during a predetermined period of time (of 3 to 10 ms, for example) is equal to or greater than a predetermined number (which may fall within the range of 10 to 40), it can be seen whether there is a fingerprint or not.

If no fingerprints have been detected by the method described above in a situation where a tracking failure has occurred while a read operation is performed for the first time, then the cause of the tracking failure may be presumed to be a bubble and the filter settings and other settings of the servo control may be changed so as not to respond to a pseudo off-track component that will appear in the TE signal.

Hereinafter, an optical disc apparatus according to this preferred embodiment will be described. As the basic configuration of this preferred embodiment is the same as the optical disc apparatus of the first preferred embodiment described above, the optical disc apparatus of this preferred embodiment will be described with reference to FIGS. 2A and 2B.

In the preferred embodiment described above, if a significant tracking error has occurred to make it necessary to get a retry operation done when the light beam spot passes a defect, that defect is presumed to be a bubble and the settings are changed into the best ones to cope with bubbles when the retry operation is performed. In other words, the presence of a bubble is detected by determining whether or not a significant tracking error has occurred. On the other hand, according to preferred embodiment, instead of detecting a bubble by determining whether or not a significant tracking error has occurred, the fingerprint dots are detected directly. And if no fingerprint dots have been detected, then the defect is determined to be a bubble.

As described above, the size of a light beam spot on a BD is so small that fingerprint dots and the interval between the dots can be distinguished from each other when the light beam spot crosses a fingerprint. In other words, if a brief decrease in the intensity of the reflected light has been detected a number of times during a certain period, then it can be determined that the decrease in the intensity of the reflected light has been caused by fingerprint dots.

According to this preferred embodiment, under the initial settings, the waveform shaping setting section 127 shown in FIG. 2B also outputs a zero-level hold signal responsive to the detection of fingerprint dots. That is to say, even when fingerprint dots are detected, the tracking control is not put on hold. Also, in this preferred embodiment, the gain of the tracking servo can be set to be one of the three different levels of H, M and L and the medium gain (M) is selected in the initial state. In such a state, even if there are fingerprint dots, the tracking can get done with no problem.

In a situation where the optical disc apparatus is operating under such initial settings, even if the optical disc had some fingerprints but no bubbles, a track jump could still happen due to the vibrations or impact or partial wobbling of the track. In that case, if it were determined by mistake that there is a bubble and if the settings were changed as a result to extend the hold period, then the percentage of occurrence of track jumps would increase due to the fingerprint. To overcome such a problem, according to this preferred embodiment, even if a track jump has occurred while the read operation is performed for the first time, it is not immediately attributed to bubbles but it is determined, by the waveform of the defect detection signal, whether or not there is a fingerprint. And if there is a fingerprint, the settings are not changed into ones to cope with bubbles during the retry operation. Instead, the retry operation is performed under the original settings.

According to this preferred embodiment, the presence of a fingerprint is detected in the following manner.

Specifically, if the RF added signal shown in portion (b) of FIG. 3 has been obtained due to the presence of a fingerprint, then the defect detecting section 124 generates the defect detection signal shown in portion (c) of FIG. 3. This defect detection signal includes a number of pulses representing a lot of fingerprint dots unlike a defect detection signal obtained in a situation where there is a bubble. Thus, if a read operation is performed on a BD at a standard rate, then the number of pulses is counted during a predetermined period of time (of 5 ms, for example) being kept by a timer. And if the count exceeds a predefined reference (e.g., 20), it can be determined that there is a fingerprint. On the other hand, if the number of pulses is equal to or smaller than the reference, it can be determined that there is no fingerprint. Such references are preferably changed according to the read rate.

Alternatively, the time width of each pulse may be measured by the timer and it can be determined, by the time width, whether the defect is a bubble or not. This is because the pulse width of a bubble is much greater than that of a fingerprint dot.

According to such a method, it is possible to avoid an unwanted situation where the settings are changed inappropriately into ones to cope with bubbles even though actually there is a fingerprint on the optical disc when a tracking failure occurs. As a result, the unintentional increase in the frequency of occurrence of tracking failures by the change of the settings can be prevented.

Figure 2C:
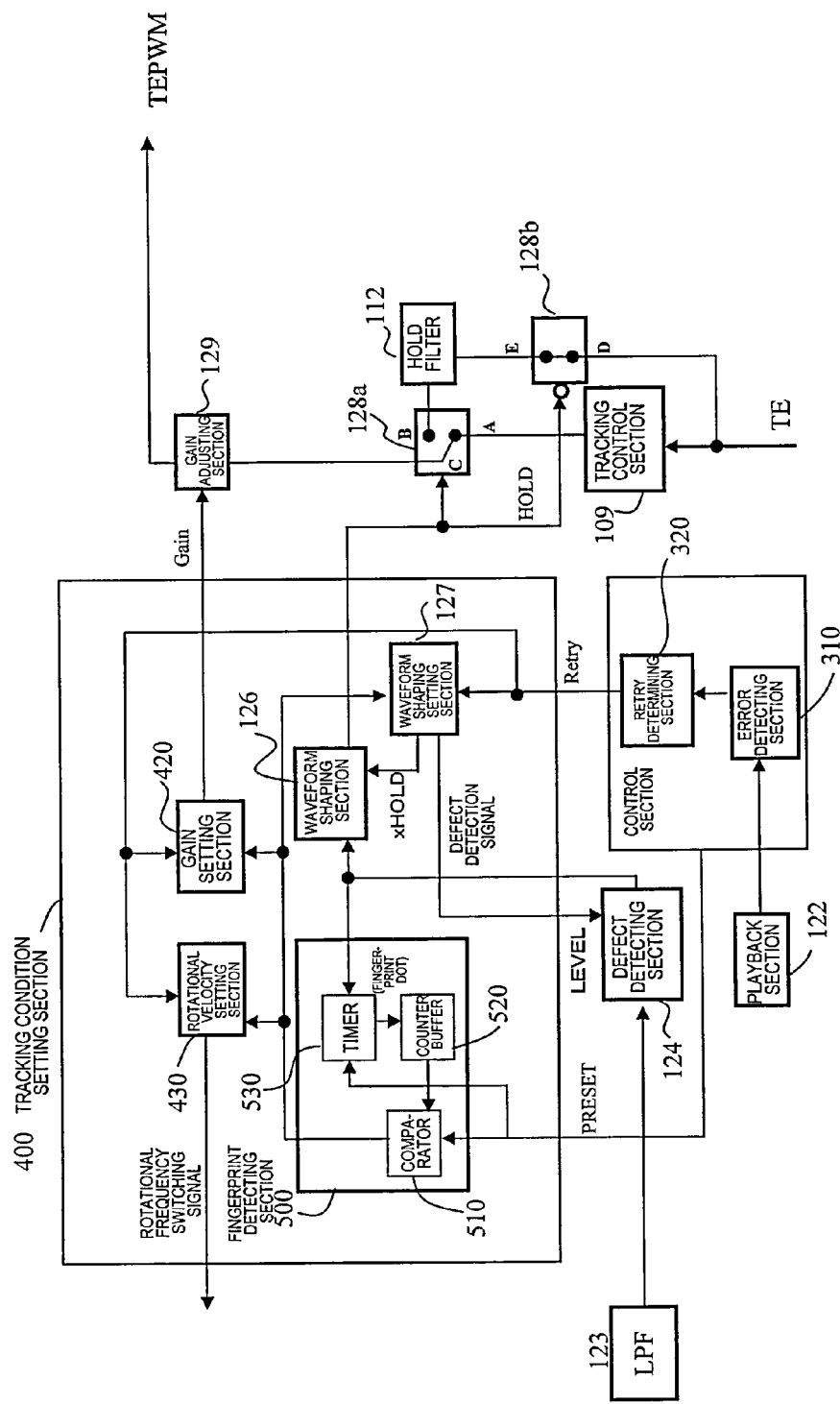
FIG. 2C shows an exemplary configuration for the fingerprint detecting section 500.

FIG. 2C is a block diagram showing a configuration for the tracking condition setting section 400 including a fingerprint detecting section 500. In FIG. 2C, as for any component having substantially the same function as the counterpart shown in FIG. 2B, the description thereof will be omitted herein to avoid redundancies. Instead, the configuration and operation of the fingerprint detecting section 500 will be described in detail.

The defect detection signal generated by the defect detecting section 124 is input to the timer 530 of the fingerprint detecting section 500. In response, the timer 530 measures the time width of each pulse of the defect detection signal and notifies a counter buffer 520 of the result. The output of the counter buffer 520 is passed to a comparator 510. And a signal representing the result of comparison made by the comparator 510 is supplied to the waveform shaping setting section 127, the gain setting section 420 and the rotational velocity setting section 430.

The fingerprint detecting section 500 with such a configuration can detect a fingerprint by counting the number of pulses representing a series of fingerprint dots. As described above, there is not a significant difference in size between human fingertips. Likewise, although there is some difference between individuals, the sizes of fingerprint dots are also almost the same between them. That is why the amount of time it takes for the light beam to cross a fingerprint or a fingerprint dot is determined by the scan rate (i.e., the linear velocity) of the light beam moving on the optical disc. Supposing each fingerprint dot has a diameter of 65 μm and an arrangement pitch of 100 μm and the area where the fingerprint is left (which will be referred to herein as a "fingerprint left area") has a size of 2 cm as measured in the scanning direction, pulses representing at most 120 fingerprint dots will be counted while the light beam is crossing the fingerprint left area. In that case, if a read operation is being performed on a BD at a linear velocity of 5 m/s, it will take 4 ms for the light beam to cross the fingerprint left area. Consequently, it can be determined in that range corresponding to approximately 4 ms whether there is a fingerprint or not. In that range, the number of pulses to be detected due to the presence of fingerprint dots is 120 at most. But as for normal defects other than fingerprints such as bubbles or dust, just a single or several pulses are generated in that range, no matter what the type of that defect is. That is why if ten or more pulses have been detected consecutively in that range of 4 ms, for example, it can be determined that the light beam is now crossing the fingerprint left area.

In a preferred embodiment, multiple different measuring periods and multiple different pulse widths, representing fingerprint dots, are defined according to the optical disc read rate and stored in the timer 530. For example, if the read rate is represented by a linear velocity of 5 m/s, then the measuring period is defined to last 4 ms and the pulse reference value is defined to be 10. However, if the read rate is represented by a linear velocity of 10 m/s, then the measuring period is defined to last 2 ms and the pulse reference value is kept unchanged at 10. Furthermore, unless no pulses of the defect detection signal have been counted during a certain period of time (of 10 ms, for example), the timer 520 may be reset. And when a fingerprint dot is detected, the timer 520 may start counting.

Then, the comparator 510 compares the count of the counter buffer 520 to the reference value. And based on the result of that comparison, the fingerprint detecting section 500 determines whether the defect is a fingerprint or not. The result of that decision is also provided for the gain setting section 420 and the rotational velocity setting section 430 in the same processor 111.

Such a fingerprint detecting section 500 can determine whether the defect is a fingerprint or not when the light beam passes the fingerprint while a read operation is performed for the first time. That is why if no fingerprints are detected when a tracking failure occurs, then the tracking conditions can be changed appropriately into ones to cope with bubbles when a retried read operation is performed (i.e., when the read operation is performed for the second time). The tracking conditions can be changed just as already described for the first preferred embodiment.

In this preferred embodiment, if a read error has occurred under the initial tracking conditions and if no fingerprints or bubbles have been detected, then it is very likely that that read error has been caused due to another factor such as an external vibration or impact. In that case, when the read operation is performed for the second time, the settings are not changed but the retry operation is carried out under the best settings to cope with fingerprints.

Although the optical disc apparatus of the first preferred embodiment is supposed to change the tracking conditions on a presumption basis, the apparatus of this preferred embodiment can change the tracking conditions more adaptively according to the real situation. That is why even if a tracking failure has occurred but if a fingerprint has been detected, the settings during the retry operation can be kept effective with respect to the fingerprint. As a result, an optical disc apparatus with good read performance can be provided.

Hereinafter, it will be described with reference to the flowchart shown in FIG. 5A how to get the processing of this preferred embodiment done during a read operation.

First of all, after the optical disc apparatus of this preferred embodiment has been loaded with a BD, a read operation on the BD is started in Step S21. In this case, the waveform shaping setting section 127 shown in FIG. 2C sets the waveform shaping so as to reduce the hold time to zero (in Step S22) and then sets the tracking servo gain to the medium level M (in Step S23).

Next, a read operation is performed on a particular single track in Step S24 and then it is determined in Step S25 whether a read error has occurred or not. If any read error has occurred, then it is determined in Step S26 whether or not a series of multiple pulses are included in a predetermined range of the defect detection signal. If multiple pulses such as those shown in portion (c) of FIG. 3 have been detected, then it is determined that there is a fingerprint on the optical disc and the process advances, without changing the initial settings, to Step S27, in which it is determined whether or not the read operation has been performed n times (where n is a predetermined number) or not. If the answer is YES, the process advances to Step S28, in which a read error is indicated and the read operation is stopped. In that case, an alert message such as "wipe the fingerprint away from the optical disc" may be posted on the monitor screen of the optical disc apparatus.

On the other hand, if it is determined in Step S27 that the read operation has been performed less than n times yet, then the process goes back to Step S24, in which the read operation is retried. In that case, the tracking control hold period and the servo gain that have been set initially are maintained and the retried read operation is performed under the conditions to cope with fingerprints. That is to say, it is presumed that the tracking failure has been caused by some impact that has been externally applied to the apparatus, not a bubble, and the read operation is just retried.

Also, if it turned out in Step S26 that multiple pulses are not included in the defect detection signal, then it is presumed that the optical disc has no fingerprints but the read error should have occurred due to the presence of a bubble. In that case, the process advances to Step S29, in which the servo gain of the tracking control is decreased from the initial value M into L. Also, in Step S30, the settings of waveform shaping are changed, thereby changing the tracking control hold periods into an appropriate value to cope with bubbles. In that case, the hold period can be defined to be longer than the amount of time it takes for the light beam spot to cross a bubble of an average size (e.g., in the range of 100 μs to 300 μs, for example). In this manner, if no fingerprints have been detected, the settings are changed into ones to cope with bubbles and then the process advances to Step S24 to perform a retried read operation.

It should be noted that if it has been determined in Step S25 that no read error has occurred, then the read operation is continued as it is.

In the processing flow just described, the settings of waveform shaping are changed in Step S30, thereby adjusting the tracking control hold period into an appropriate one to cope with bubbles. However, this setting change processing step may be omitted. That is to say, just by decreasing the servo gain as in the flowchart shown in FIG. 5B, it is also possible to prevent the tracking servo system from responding to the pseudo off-track component caused by a bubble. As described above, with the servo gain of the tracking control decreased sufficiently, even if the pseudo off-track component produced by a bubble appears in the TE signal, the system can ignore that component without responding to it.

In the example shown in FIG. 5B, the tracking control servo gain is decreased to change the settings during the retried read operation into appropriate ones to cope with bubbles. Alternatively, instead of changing the servo gain values, the rotational velocity of the optical disc (or the read rate) may be increased. Thus, the optical disc apparatus of this alternative preferred embodiment increases the rotational frequency of the optical disc without decreasing the servo gain during the retried read operation.

FIG. 6 is a flowchart showing the procedure of operation in this preferred embodiment. Unlike the operating procedure shown in FIG. 5B, if no fingerprints have been detected in Step S26, the process advances to Step S40, in which the rotational velocity of the disc motor 200 (see FIG. 2C) is increased.

As described above, the higher the rotational velocity of an optical disc, the shorter the amount of time it takes for a light beam spot to cross a bubble. Once the passage time has been shortened in this manner, even if a pseudo off-track component produced by a bubble appeared in the TE signal, the system would not respond to such a component and the probability of occurrence of tracking failures could be reduced.

If an error has occurred while a read operation is performed for the first time, then a seek operation toward the target track needs to be performed to get a retry operation done. However, by increasing the rotational velocity of the optical disc as is done in this preferred embodiment, the retry operation can also get done in a shorter time, which is also beneficial.

Optionally, the present invention could be carried out as a combination of the preferred embodiments described above. Also, the present invention is applicable to a situation where data needs to be written, not just the situation where data needs to be read.

It should be noted that if there were a third type of defect such as a scratch on the surface of a disc, then the intensity of the light reflected from that portion would decrease significantly. That is why such a defect could be easily distinguished from fingerprints or bubbles. For that reason, if a defect such as a scratch is detected during the initial setting stage, then settings can be defined so as to put the tracking control on hold.

Embodiment 3

The present invention is also applicable to an optical disc apparatus that can read data from multiple types of optical discs including a first type of optical disc compliant with the BD standard (which will be simply referred to herein as a "BD") and a second type of optical disc compliant with the HD-DVD standard (which will be simply referred to herein as an "HD-DVD").

Hereinafter, an optical disc apparatus as a third preferred embodiment of the present invention will be described with reference to FIG. 13. The optical disc apparatus of this preferred embodiment is a drive compatible with both BDs and HD-DVDs and its configuration is schematically shown in FIG. 13. The optical disc apparatus shown in FIG. 13 basically has the same configuration as the counterpart shown in FIG. 1. The differences from the apparatus shown in FIG. 1 lie in that the optical disc apparatus of this preferred embodiment includes a disc type recognition section 330 and that the optical pickup 104 includes multiple objective lenses including an objective lens for BDs and an objective lens for HD-DVDs. The same components as the counterparts of the preferred embodiment shown in FIG. 1 and their operations will not be described again.

In reading or writing data from/on an HD-DVD, the size of a light beam spot on the surface of the optical disc is bigger than a BD's but smaller than a DVD's.

A light beam for use to play an HD-DVD has a wavelength of 405 nm (which is the wavelength of a blue-violet semiconductor laser diode). But an objective lens for HD-DVDs has a numerical aperture NA of 0.65. The effective size (i.e., the effective cross section) of a beam spot on the information layer of an HD-DVD is approximately 1.7 times as large as the light beam spot 10 shown in portion (a) of FIG. 10. And the diameter of the former light beam spot is about 0.5 µm, which is approximately 1.3 times as large as that of the latter light beam spot. Furthermore, the light-transmitting layer of an HD-DVD has a thickness of 0.6 mm, which is as thick as that of a DVD but six times as thick as that of a BD. Consequently, the spot diameter on the disc surface of an HD-DVD is approximately 0.5 mm or more, which is almost equal to, or slightly bigger than, the spot diameter on the disc surface of a DVD.

As described above, the pitch between fingerprint dots is normally in the range of about 0.2 mm to about 0.3 mm. That is why even on an HD-DVD, multiple fingerprint dots 12 will be included in a single beam spot. For that reason, just like DVDs currently available, the respective fingerprint dots 12 cannot be detected, either, based on the intensity of the reflected light (see FIG. 12). That is to say, the fingerprint that has been left on the surface of an HD-DVD cannot be detected properly with the light beam that irradiates the HD-DVD.

Just like a DVD, an HD-DVD is also made by bonding together two base members, each having a thickness of approximately 600 µm. For that reason, bubbles are rarely produced between the two base members. Also, even if bubbles were produced between the base members, the disc surface would never be raised by the bubbles because one of the two base members, functioning as a light-transmitting layer, is as thick as 600 µm. Furthermore, in an HD-DVD, the wavelength of the light beam used is equal to that of a light beam for BDs, and the numerical aperture NA thereof is approximately equal to the NA of a DVD. As a result, the sensitivity of an HD-DVD to a spherical aberration is approximately a sixth as high as that of a BD. Consequently, in an HD-DVD, the TE signal and the light quantity signal are hardly affected by bubbles.

Thus, if its disc type recognition section 330 has recognized the given optical disc as a BD, the optical disc apparatus of this preferred embodiment that can read and write data from/on both HD-DVDs and BDs (i.e., a so-called "universal drive") sets the tracking conditions such that tracking failures will occur less easily due to the presence of fingerprints while the read operation is performed for the first time. Such conditions are set by the tracking condition setting section 400. The disc type recognition section of this preferred embodiment may recognize the type of the given optical disc by any of various methods. That is to say, the recognition method itself is not limited to any particular one. In the example shown in FIG. 13, the function of the disc type recognition section 330 is performed by the controller 101, which gets information about the type of the given optical disc from the output of the playback section 122. Alternatively, the disc type recognition section 330 may also recognize the type of the given optical disc based on the waveform of any other signal obtained from the optical disc such as a focus error signal.

In this preferred embodiment, in reading or writing data from/on a BD, the optical pickup 104 converges a light beam on the information layer of the optical disc 102 through a BD objective lens with an NA of 0.85. And if a read operation is performed for the second time and so on (i.e., if a retried read operation is performed) after a tracking failure has occurred while the read operation is performed for the first time, the tracking condition setting section 400 changes the tracking conditions into ones on which tracking failures will less likely to occur. These operations are performed just as already described for the other preferred embodiments.

The initial setting adopted by the tracking condition setting section is defined so as to avoid the influence of fingerprints by shortening the hold period of the TE signal (including reducing the hold period to zero), for example, thereby getting a tracking control done based on the TE signal even between fingerprint dots. That is why even if there is a fingerprint over a broad area on the disc surface, information about the tracking error can still be obtained properly from the areas between the fingerprint dots and the apparatus can operate without causing tracking failures easily.

With such an initial setting, if there is a bubble, a tracking failure will occur easily due to a pseudo off-track component produced in the TE signal. In the first preferred embodiment of the present invention, however, the apparatus lets such tracking failures occur. That is to say, if a tracking failure has occurred, the defect on the optical disc that would have caused the failure is presumed to be a bubble, not a fingerprint, and the initial setting that has been defined to avoid the influence of fingerprints is changed into a one that will work fine to avoid the influence of bubbles.

On the other hand, if the disc type recognition section 330 has recognized the given optical disc as an HD-DVD, then the tracking condition setting section 400 sets the tracking conditions such that tracking failures will occur less easily due to the presence of fingerprints when a read operation is performed for the first time after the disc has been loaded. This is because an HD-DVD is no more affected by bubbles than a DVD is. The tracking condition setting section 400 of this preferred embodiment stores in advance not only tracking conditions for BDs but also ones for HD-DVDs as well. Also, as will be described later, the contents of the tracking conditions to be defined first during the disc loading process are different between BDs and HD-DVDs.

In reading or writing data from/on an HD-DVD, the optical pickup 104 converges a light beam on the information layer of the optical disc 102 through an HD-DVD objective lens with an NA of 0.65. In a situation where the given optical disc is an HD-DVD, however, even if a read operation is performed for the second time and so on (i.e., if a retried read operation is performed) after a tracking failure has occurred, the read operation is just retried repeatedly under such conditions as to cause tracking failures less easily due to fingerprints without changing the tracking conditions. This is because as for HD-DVDs, there is no need to consider the probability of occurrence of tracking failures due to bubbles.

It should be noted that such conditions as to cause tracking failures less easily in HD-DVDs due to fingerprints are different from ones for BDs. This is because since track pitches and beam spot sizes on the information layer of the optical disc are different between HD-DVDs and BDs, the conditions that will cause tracking failures less easily due to fingerprints are also different between them. More specifically, if the given optical disc is an HD-DVD, it is effective to decrease the gain intersection frequency of the tracking servo or reduce the gain in the vicinity of 1 kHz compared to a situation where the given optical disc is a BD.

In the preferred embodiment described above, the optical pickup 104 is supposed to include two separate objective lenses for BDs and for HD-DVDs. However, according to the present invention, the optical pickup does not have to have such a configuration. To reduce the overall size of the apparatus, a single objective lens may be used for both BDs and HD-DVDs.

Optionally, the optical disc apparatus of the present invention may also be designed so as to read and/or write data from/on not just BDs and HD-DVDs but also other types of optical discs (such as DVDs and CDs) as well.

Industrial Applicability

The optical disc apparatus of the present invention can perform a read operation appropriately even on an optical disc, in which bubbles may have been produced during its manufacturing process, and therefore, can be used effectively in BDs and other next-generation optical discs.

The invention claimed is:

1. An optical disc apparatus comprising:
at least one objective lens that converges a light beam on an information layer of an optical disc;
a photodetector for generating a light detection signal based on light that has been reflected from the optical disc;
a tracking actuator for driving the objective lens along the radius of the optical disc;
a tracking error detecting section for generating a tracking error signal based on the light detection signal;
a tracking control section for driving the tracking actuator based on the tracking error signal to make the light beam follow tracks on the disc;
a defect detecting section for detecting, based on the light detection signal, a portion of the optical disc where the intensity of the reflected light has decreased as a defect, thereby outputting a defect detection signal; and
a tracking condition setting section for setting a tracking condition that determines how easily a tracking failure is caused by the defect,
wherein if multiple types of defects that could occur on the optical disc include a first type of defect, of which the size is relatively small, and a second type of defect, of which the size is relatively large, the tracking condition setting section initially adopts, as the tracking condition, a condition on which a tracking failure is less likely to occur due to the first type of defect, but
if any tracking abnormality has occurred during a read operation, the tracking condition setting section changes the tracking conditions into a one on which a tracking failure is less likely to occur due to the second type of defect.

2. The optical disc apparatus of claim 1, wherein the size of the first type of defect is smaller than the diameter of a light beam spot to be formed by the light beam on the surface of the optical disc, while the size of the second type of defect is greater than the diameter of the light beam spot.

3. The optical disc apparatus of claim 2, wherein the first type of defect is a fingerprint dot that has been left on the surface of the optical disc, while the second type of defect is a bubble that has been produced inside the optical disc.

4. The optical disc apparatus of claim 1, wherein the tracking condition setting section includes a hold signal generating section for generating, based on the defect detection signal, a hold signal for holding the tracking error signal at a level just before the defect has occurred, and
wherein if a tracking failure has occurred under the initial tracking condition, then the tracking condition setting section changes the settings of the hold signal generating section such that a hold period, defined by the hold signal, is extended compared to the one before the tracking failure has occurred.

5. The optical disc apparatus of claim 1, wherein the tracking condition setting section includes a gain setting section for controlling the gain of tracking control, and
wherein if any tracking abnormality has occurred, the tracking condition setting section decreases the value of the gain.

6. The optical disc apparatus of claim 1, wherein the tracking condition setting section includes a rotational velocity setting section for controlling the rotational velocity of the optical disc, and wherein if any tracking abnormality has occurred, the tracking condition setting section increases the rotational velocity.

7. The optical disc apparatus of claim 1, further comprising a retry determining section for determining whether or not a retried read operation should be performed in a situation where a tracking error or a read error, of which the magnitude is equal to or greater than a predetermined value, has occurred during a read operation.

8. The optical disc apparatus of claim 1, wherein if a tracking error or a read error, of which the magnitude is equal to or greater than a predetermined value, has occurred during a read operation, the tracking condition setting section changes the tracking conditions into a one, on which a tracking failure is less likely to occur due to the second type of defect, before the tracking failure actually happens.

9. The optical disc apparatus of claim 1, wherein if the defect detection signal has not been generated in a situation where the tracking failure has occurred, the tracking condition setting section does not change the tracking conditions even during a retried read operation.

10. The optical disc apparatus of claim 1, further comprising fingerprint detecting means for determining whether or not the defect is a fingerprint, wherein if the defect has turned out to be a fingerprint in a situation where a tracking failure has occurred due to the defect, the tracking condition setting section performs a retried read operation without changing the tracking conditions.

11. An optical disc apparatus having the ability to read data from multiple types of optical discs, including a first type of optical disc compliant with a BD standard and a second type of optical disc compliant with an HD-DVD standard, the apparatus comprising:

at least one objective lens that converges a light beam on an information layer of a given optical disc, which has been selected from the multiple types of optical discs and with which the optical disc apparatus is loaded;

a photodetector for generating a light detection signal based on light that has been reflected from the optical disc;

a tracking actuator for driving the objective lens along the radius of the optical disc;

a tracking error detecting section for generating a tracking error signal based on the light detection signal;

a tracking control section for driving the tracking actuator based on the tracking error signal to make the light beam follow tracks on the disc;

a defect detecting section for detecting, based on the light detection signal, a portion of the optical disc where the intensity of the reflected light has decreased as a defect, thereby outputting a defect detection signal; and a tracking condition setting section for setting a tracking condition that determines how easily a tracking failure is caused by the defect, wherein the tracking condition setting section changes the tracking conditions depending on whether the given optical disc is the first type or the second type.

12. The optical disc apparatus of claim 11, wherein while performing a retry operation after a tracking failure has occurred due to the defect, the tracking condition setting section does change the tracking conditions if the given optical disc is the first type but does not change the tracking conditions if the given optical disc is the second type.

13. The optical disc apparatus of claim 11, wherein in a situation where the given optical disc is the first type, if multiple types of defects that could occur on the optical disc include a first type of defect, of which the size is relatively small, and a second type of defect, of which the size is relatively large, the tracking condition setting section initially adopts, as the tracking condition, a condition on which a tracking failure is less likely to occur due to the first type of defect, but if any tracking abnormality has occurred during a read operation, the tracking condition setting section changes the tracking conditions into a one on which a tracking failure is less likely to occur due to the second type of defect.

14. The optical disc apparatus of claim 13, wherein the first type of defect is a fingerprint dot that has been left on the surface of the optical disc, while the second type of defect is a bubble that has been produced inside the optical disc.

15. The optical disc apparatus of claim 12, wherein in a situation where the given optical disc is the second type, if multiple types of defects that could occur on the optical disc include a first type of defect, of which the size is relatively small, and a second type of defect, of which the size is relatively large, the tracking condition setting section initially adopts, as the tracking condition, a condition on which a tracking failure is less likely to occur due to the first type of defect, but if any tracking abnormality has occurred during a read operation, the tracking condition setting section performs a retry operation without changing the tracking conditions.

16. An integrated circuit device for use in an optical disc apparatus that includes an optical pickup and a tracking control section, the circuit device comprising:

a defect detecting section for detecting a portion of an optical disc where the intensity of reflected light has decreased as a defect based on a light detection signal obtained from the optical pickup, thereby outputting a defect detection signal; and a tracking condition setting section for setting a tracking condition that determines how easily a tracking failure is caused by the defect, wherein if multiple types of defects that could occur on the optical disc include a first type of defect, of which the size is relatively small, and a second type of defect, of which the size is relatively large, the tracking condition setting section initially adopts, as the tracking condition, a condition on which a tracking failure is less likely to occur due to the first type of defect, but if any tracking failure has occurred during a read operation, the tracking condition setting section changes the tracking conditions into a one on which a tracking failure is less likely to occur due to the second type of defect.

17. The integrated circuit device of claim 16, wherein the tracking condition setting section includes a hold signal generating section for generating, based on the defect detection signal, a hold signal for holding the tracking error signal at a level just before the defect has occurred, and wherein if a tracking failure has occurred under the initial tracking condition, then the tracking condition setting section changes the settings of the hold signal generating section such that a hold period, defined by the hold signal, is extended compared to the one before the tracking failure has occurred.

18. The integrated circuit device of claim 16, wherein the tracking condition setting section includes a gain setting section for controlling the gain of tracking control, and wherein if any tracking failure has occurred, the tracking condition setting section decreases the value of the gain.

19. The integrated circuit device of claim 16, wherein the tracking condition setting section includes a rotational velocity setting section for controlling the rotational velocity of the optical disc, and wherein if any tracking failure has occurred, the tracking condition setting section increases the rotational velocity.

* * * * *